United States Patent
Palanki et al.

(10) Patent No.: US 8,971,241 B2
(45) Date of Patent: Mar. 3, 2015

(54) TECHNIQUES FOR SUPPORTING RELAY OPERATION IN WIRELESS COMMUNICATION SYSTEMS

(75) Inventors: Ravi Palanki, San Diego, CA (US); Kapil Bhattad, San Diego, CA (US); Naga Bhushan, San Diego, CA (US); Aamod D. Khandekar, San Diego, CA (US); Tingfang Ji, San Diego, CA (US); Juan Montojo, San Diego, CA (US)

(73) Assignee: QUALCOLMM Incorporated, San Diego, CA (US)

( * ) Notice: Subject to any disclaimer, the term of this patent is extended or adjusted under 35 U.S.C. 154(b) by 632 days.

(21) Appl. No.: 12/568,242

(22) Filed: Sep. 28, 2009

(65) Prior Publication Data

US 2010/0080139 A1    Apr. 1, 2010

Related U.S. Application Data

(60) Provisional application No. 61/101,571, filed on Sep. 30, 2008, provisional application No. 61/101,656, filed on Sep. 30, 2008, provisional application No. 61/102,337, filed on Oct. 2, 2008, provisional application No. 61/106,917, filed on Oct. 20, 2008.

(51) Int. Cl.
*H04W 72/04* (2009.01)
*H04L 1/00* (2006.01)
(Continued)

(52) U.S. Cl.
CPC ............. *H04L 1/0023* (2013.01); *H04W 28/00* (2013.01); *H04B 7/2606* (2013.01); *H04L 1/0001* (2013.01)
USPC .......................................... 370/328; 370/522

(58) Field of Classification Search
USPC .................. 370/254, 310, 312, 328, 522, 528
See application file for complete search history.

(56) References Cited

U.S. PATENT DOCUMENTS

| | | | |
|---|---|---|---|
| 6,285,665 | B1 | 9/2001 | Chuah |
| 6,708,042 | B1 | 3/2004 | Hayakawa |

(Continued)

FOREIGN PATENT DOCUMENTS

| | | |
|---|---|---|
| CN | 101072085 A | 11/2007 |
| EP | 1863210 A1 | 12/2007 |

(Continued)

OTHER PUBLICATIONS

Motorola, "MBSFN Sub-frame Allocation Signalling," Mar. 31-Apr. 4, 2008, 3GPP TSG-RAN WG2#61bis, All Pages.*

(Continued)

*Primary Examiner* — Curtis A Alia
(74) *Attorney, Agent, or Firm* — Larry Moskowitz

(57) ABSTRACT

Techniques for supporting operation of relay stations in wireless communication systems are described. In an aspect, a bitmap may be sent by a base station and/or a relay station to identify subframes of at least two types in multiple radio frames. For example, the bitmap may indicate whether each subframe covered by the bitmap is of a first type or a second type. UEs may use the bitmap to control their operation. For example, a UE may perform channel estimation or measurement for the subframes of the first type and may skip channel estimation and measurement for the subframes of the second type. In another aspect, a base station may transmit data and/or control information on resources not used by a relay station to transmit a reference signal. This may avoid interference to the reference signal from the relay station, which may improve performance for UEs communicating with the relay station.

21 Claims, 18 Drawing Sheets

(51) Int. Cl.
*H04W 28/00* (2009.01)
*H04B 7/26* (2006.01)

(56) References Cited

U.S. PATENT DOCUMENTS

| | | | |
|---|---|---|---|
| 6,975,608 | B1 | 12/2005 | Park et al. |
| 7,092,434 | B2 | 8/2006 | Moon et al. |
| 7,130,352 | B2 | 10/2006 | Shimizu |
| 7,161,957 | B2 | 1/2007 | Wang et al. |
| 7,936,741 | B2 | 5/2011 | Vimpari et al. |
| 8,155,222 | B2* | 4/2012 | McBeath et al. ............ 375/260 |
| 8,498,650 | B2 | 7/2013 | Fernandez-Corbaton |
| 2002/0093918 | A1 | 7/2002 | Kim et al. |
| 2002/0159410 | A1 | 10/2002 | Odenwalder et al. |
| 2003/0052909 | A1 | 3/2003 | Mo et al. |
| 2003/0123559 | A1 | 7/2003 | Classon et al. |
| 2003/0169722 | A1 | 9/2003 | Petrus et al. |
| 2004/0184417 | A1 | 9/2004 | Chen et al. |
| 2004/0196870 | A1 | 10/2004 | Cheng et al. |
| 2005/0002324 | A1* | 1/2005 | Sutivong et al. ............ 370/208 |
| 2005/0018629 | A1 | 1/2005 | Kwon et al. |
| 2005/0050427 | A1 | 3/2005 | Jeong et al. |
| 2005/0201279 | A1 | 9/2005 | Tan et al. |
| 2005/0259629 | A1 | 11/2005 | Oliver et al. |
| 2005/0265302 | A1* | 12/2005 | Nishibayashi et al. ....... 370/349 |
| 2005/0272403 | A1 | 12/2005 | Ryu et al. |
| 2006/0146762 | A1 | 7/2006 | Kuroda et al. |
| 2006/0183441 | A1* | 8/2006 | Irie et al. .................... 455/115.1 |
| 2006/0262839 | A1 | 11/2006 | Tseng et al. |
| 2006/0281417 | A1 | 12/2006 | Umesh et al. |
| 2006/0293076 | A1 | 12/2006 | Julian et al. |
| 2007/0049305 | A1 | 3/2007 | Bachl et al. |
| 2007/0086367 | A1 | 4/2007 | Sung et al. |
| 2007/0099577 | A1 | 5/2007 | Lee et al. |
| 2007/0147517 | A1 | 6/2007 | Hu |
| 2007/0173194 | A1* | 7/2007 | Vare et al. .................... 455/3.04 |
| 2007/0189164 | A1 | 8/2007 | Smith et al. |
| 2007/0190933 | A1 | 8/2007 | Zheng et al. |
| 2007/0297351 | A1 | 12/2007 | Trainin |
| 2008/0032625 | A1 | 2/2008 | Cheung et al. |
| 2008/0045272 | A1 | 2/2008 | Wang et al. |
| 2008/0049669 | A1 | 2/2008 | Lundby et al. |
| 2008/0049706 | A1 | 2/2008 | Khandekar et al. |
| 2008/0068979 | A1 | 3/2008 | Visotsky et al. |
| 2008/0107062 | A1* | 5/2008 | Viorel et al. ................... 370/315 |
| 2008/0108355 | A1 | 5/2008 | Oleszcsuk |
| 2008/0117891 | A1 | 5/2008 | Damnjanovic et al. |
| 2008/0144612 | A1 | 6/2008 | Honkasalo et al. |
| 2008/0165797 | A1 | 7/2008 | Aceves et al. |
| 2008/0186900 | A1 | 8/2008 | Chang et al. |
| 2008/0212520 | A1 | 9/2008 | Chen et al. |
| 2008/0227386 | A1 | 9/2008 | Dayal et al. |
| 2008/0227461 | A1 | 9/2008 | Dayal et al. |
| 2008/0232396 | A1* | 9/2008 | Buckley et al. ............... 370/465 |
| 2008/0247354 | A1 | 10/2008 | Hsieh et al. |
| 2008/0267129 | A1 | 10/2008 | Torsner et al. |
| 2008/0273610 | A1 | 11/2008 | Malladi et al. |
| 2009/0031185 | A1 | 1/2009 | Xhafa et al. |
| 2009/0049356 | A1 | 2/2009 | Lin |
| 2009/0135807 | A1* | 5/2009 | Shrivastava et al. .......... 370/352 |
| 2009/0147717 | A1* | 6/2009 | Cai .............................. 370/312 |
| 2009/0154356 | A1 | 6/2009 | Wiemann et al. |
| 2009/0175179 | A1* | 7/2009 | Stewart et al. ................ 370/252 |
| 2009/0323641 | A1 | 12/2009 | Futagi et al. |
| 2010/0008242 | A1 | 1/2010 | Schein |
| 2010/0080166 | A1 | 4/2010 | Palanki et al. |
| 2010/0097978 | A1 | 4/2010 | Palanki et al. |
| 2010/0111058 | A1 | 5/2010 | Fischer |
| 2010/0278134 | A1 | 11/2010 | Ankel et al. |
| 2011/0044195 | A1 | 2/2011 | Wiemann et al. |
| 2011/0051643 | A1 | 3/2011 | Hans et al. |
| 2011/0145672 | A1 | 6/2011 | Jongren et al. |
| 2012/0093061 | A1 | 4/2012 | Charbit et al. |

FOREIGN PATENT DOCUMENTS

| | | |
|---|---|---|
| EP | 1890446 A2 | 2/2008 |
| EP | 1919100 A2 | 5/2008 |
| EP | 1919143 A2 | 5/2008 |
| EP | 1931155 A1 | 6/2008 |
| EP | 1933489 A1 | 6/2008 |
| EP | 1965534 A2 | 9/2008 |
| GB | 2417862 | 3/2006 |
| GB | 2443466 | 5/2008 |
| KR | 20020039122 A | 5/2002 |
| KR | 20020056986 A | 7/2002 |
| KR | 20050067331 A | 7/2005 |
| KR | 20080064743 A | 7/2008 |
| KR | 20080065245 A | 7/2008 |
| KR | 20080085770 A | 9/2008 |
| WO | 2005057976 A1 | 6/2005 |
| WO | 2007095967 A1 | 8/2007 |
| WO | 2007133022 A1 | 11/2007 |
| WO | WO2008020164 A1 | 2/2008 |
| WO | WO2008020738 A1 | 2/2008 |
| WO | WO2008024282 | 2/2008 |
| WO | WO2008024578 | 2/2008 |
| WO | 2008056774 A1 | 5/2008 |
| WO | WO2008056235 | 5/2008 |
| WO | 2008093233 A2 | 8/2008 |
| WO | 2008115003 A2 | 9/2008 |

OTHER PUBLICATIONS

Downlink Control Channel Design of IEEE 802.16m, IEEE, Piscataway, NJ, USA, Mar. 17, 2008, pp. 1-9, XP040391877 p. 1, line 1—p. 2, line 18 figures 1-3.

Ericsson et al: "Uplink ACK/NACK timing for TDD" 3GPP Draft; RI-081542, 3rd Generation Partnership Project (3GPP), Mobile Competence Centre ; 650, Route Des Lucioles ; F-06921 Sophia-Antipolis Cedex ; France, vol. RAN WGI, no. Shenzhen, China; Mar. 27, 2008, XP050109955.

Haihong Zheng et al: "HARQ with Relays" IEEE 802.16 Broadband Wireless Access Working Group, IEEE C802.16J-06/197R,, vol. C802.16J-06/197R, Nov. 7, 2006, pp. 1-9, XP003022082.

International Search Report—PCT/US2009/058875—International Search Authority, European Patent Office, May 6, 2010.

International Search Report and Written Opinion—PCT/US2009/058872, International Search Authority—European Patent Office—May 20, 2010.

International Search Report and Written Opinion—PCT/US2009/067028, International Search Authority—European Patent Office—Jun. 22, 2010.

LG Electronics: "Mbms transmission in E-UTRA" Internet Citation Nov. 7, 2005, XP003015816 Retrieved from the Internet: URL:http://ww.3gpp.org/ftp/tsg_ran/W61_RLI /TSGR1_43/Docs/RI-051300.zip> [retrieved on Jan. 1, 2007] figures la,2 p. 2, line 1-line 10.

Motorola: Downlink Control Signalling for TDD 3GPP Draft; RI-080074, 3rd Generation Partnership Project (3GPP), Mobile Competence Centre ; 650, Route Des Lucioles ; F-06921 Sophia-Antipolis Cedex ; France, vol. RAN WG1, no Sevi11 a, Spain; Jan. 8, 2008, XP050108613 [retrieved on Jan. 8, 2008].

Motorola: "MBSFN Sub-frame Allocation Signalling" 3GPP Draft; R2-081807—MBSFN-SUBFR-ALLOC, 3rd Generation Partnership Project (3GPP), Mobile Competence Centre ; 650, Route Des Lucioles ; F-06921 Sophia-Antipolis Cedex ; France, vol. RAN WG2, no. Shenzhen, China; Mar. 25, 2008, XP050139504 [retrieved on Mar. 25, 2008] p. 1, line 1—p. 2, line 10 figures 1,2.

Nokia & Nokia Siemens Networks: "Repeated transmission of ACK in TDD FS2 PUCCH" 3GPP Draft; RI-074335, 3rd Generation Partnership Project (3GPP), Mobile Competence Centre ; 650, Route Des Lucioles ; F-06921 Sophia-Antipolis Cedex ; France, vol. RAN WGI, no. Shanghai, China; Oct. 2, 2007, XP050107851.

Partial International Search Report—PCT/US09/067028, International Search Authority, European Patent Office—Mar. 8, 2010.

Partial International Search Report—PCT/US09/058872, International Search Authority, European Patent Office—Feb. 8, 2010.

(56) References Cited

OTHER PUBLICATIONS

Partial International Search Report—PCT/US09/058875, International Search Authority, European Patent Office—Feb. 18, 2010.
Tao A et al: "A Frame Structure Design for OFDMA-based Multihop Relay Networks" IEEE C802.16J-06/226 Nov. 7, 2006, pp. 1-8, XP008109072 p. 6, line 12—p. 7, line 6 figures 1-5.
Texas Instruments: "Decode and Forward Relays for E-UTRA enhancements" 3GPP Draft; RI-083533 TI Relay, 3rd Generation Partnership Project (3GPP), Mobile Competence Centre ; 650, Route Des Lucioles ; F-06921 Sophia-Antipolis Cedex ; France, no. Prague, Czech Republic; Sep. 24, 2008, XP050316897 [retrieved on Sep. 24, 2008] p. 4, line 5-line 15 p. 5, line 8-line 11 figures 1-3.
Zheng H et al: "HARQ With Relays" Internet Citation, [Online] XP003013952 Retrieved from the Internet: URL:http://www.ieee802.org/16/relay/i ndex. html> [retrieved on Jan. 1, 2007] p. 4.
Zhifeng Tao et al: "Frame Structure Design for IEEE 802.16j Mobile Multihop Relay (MMR) Networks" Global Telecommunications Conference, 2007. Globecom "07. IEEE, IEEE, Piscataway, NJ, USA, Nov. 1, 2007, pp. 4301-4306, XP031196746 ISBN: 978-1-4244-1042-2 p. 4303, col. 1, line 6—p. 4304, col. 1, line 1 abstract; figure 3.
Taiwan Search Report—TW098133191—TIPO—Jul. 2, 2013.

* cited by examiner

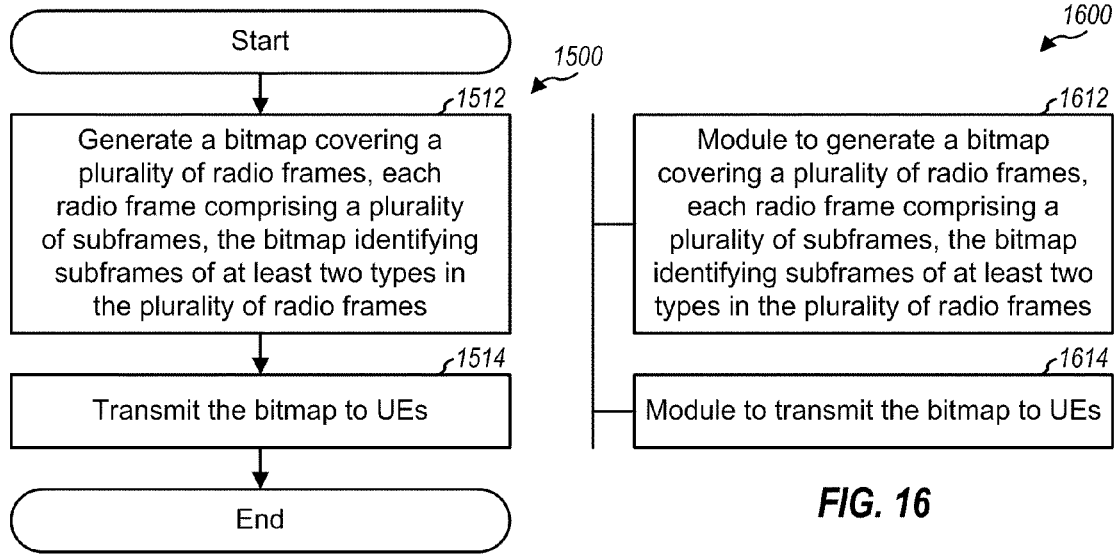
FIG. 15
FIG. 16
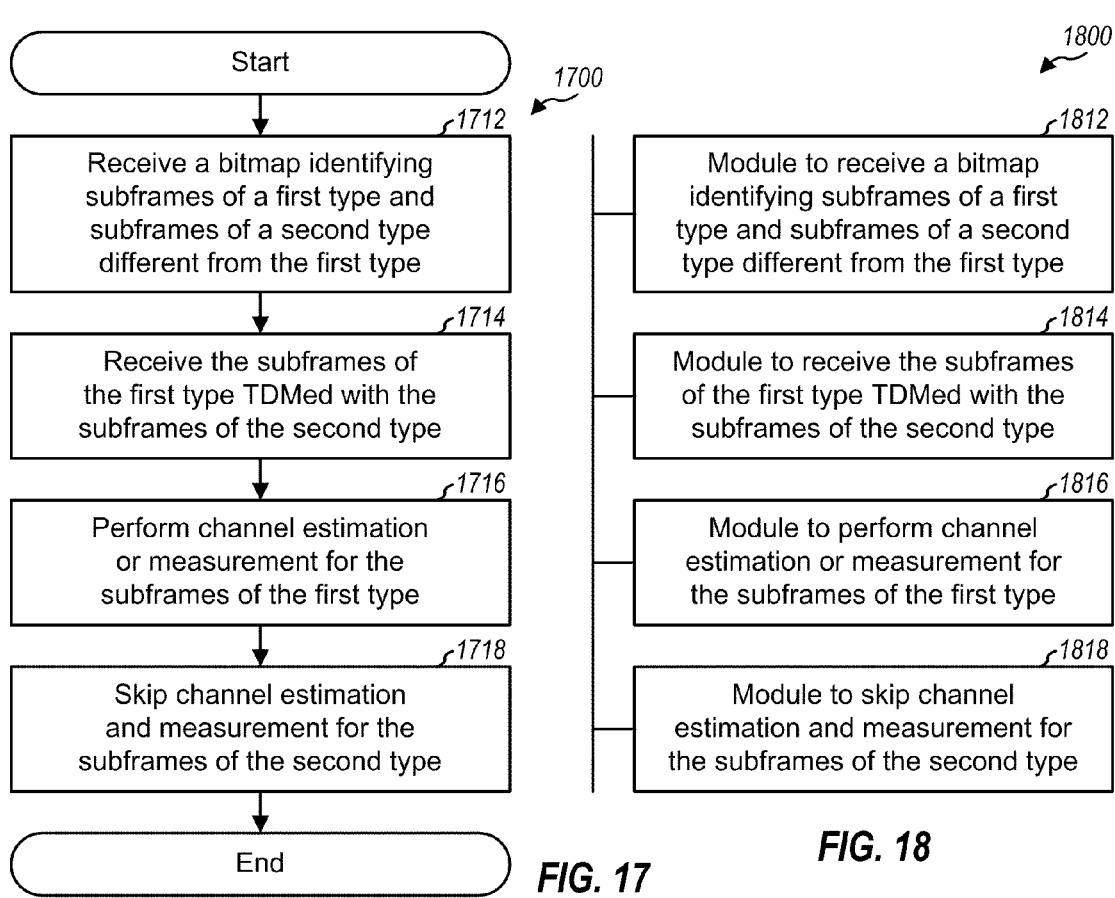
FIG. 17
FIG. 18

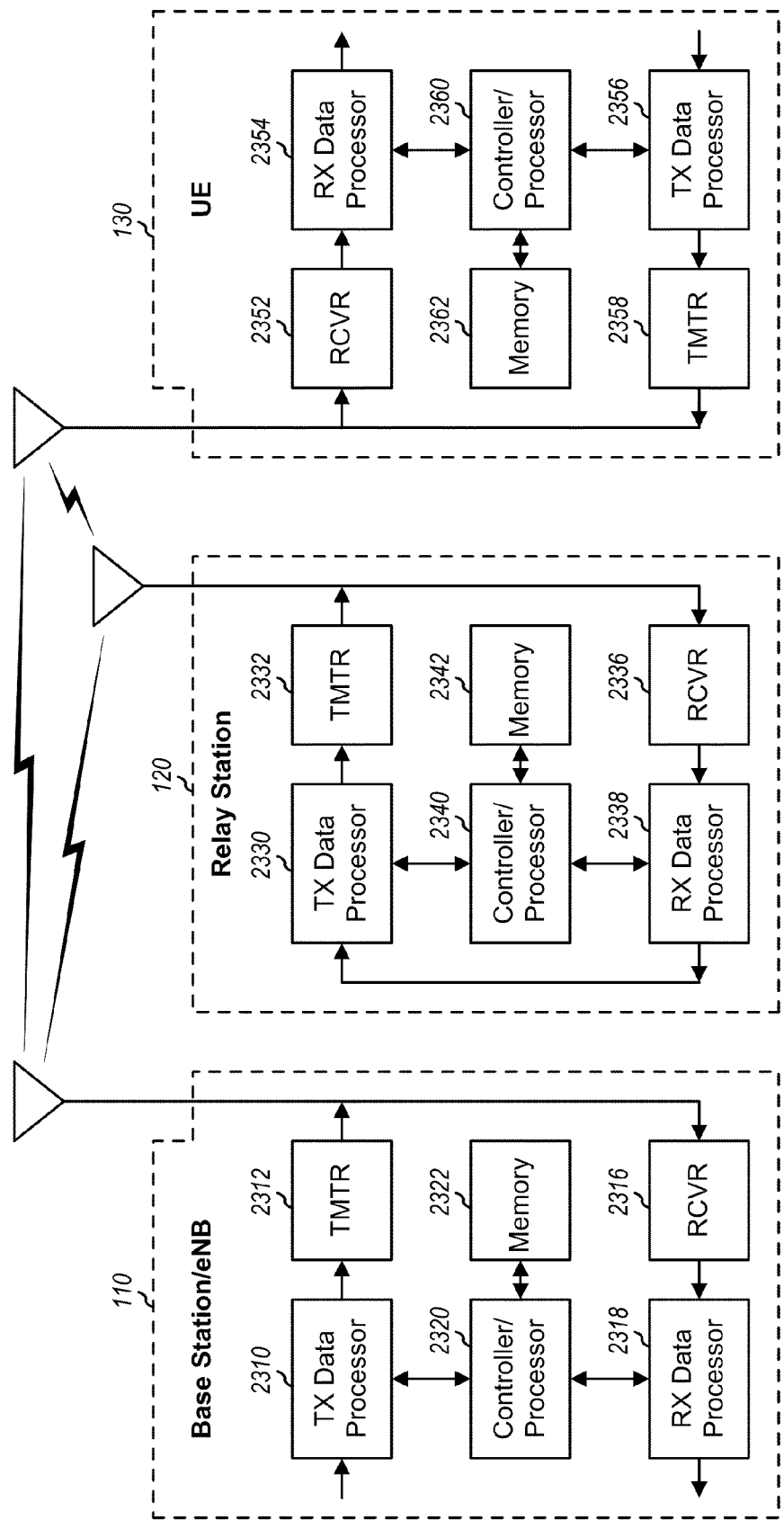

TECHNIQUES FOR SUPPORTING RELAY OPERATION IN WIRELESS COMMUNICATION SYSTEMS

CLAIM OF PRIORITY

The present application claims priority to provisional U.S. Application Ser. No. 61/101,571, filed Sep. 30, 2008, provisional U.S. Application Ser. No. 61/101,656, filed Sep. 30, 2008, provisional U.S. Application Ser. No. 61/102,337, filed Oct. 2, 2008, and provisional U.S. Application Ser. No. 61/106,917, filed Oct. 20, 2008, all entitled "RELAY OPERATION TECHNIQUES IN LONG TERM EVOLUTION SYSTEMS," assigned to the assignee hereof, and incorporated herein by reference.

CROSS-REFERENCE TO RELATED APPLICATION

This application is related to concurrently filed and commonly owned U.S. patent application Ser. No. 12/568,255, entitled "TECHNIQUES FOR SUPPORTING RELAY OPERATION IN WIRELESS COMMUNICATION SYSTEMS," and assigned, the disclosure of which is hereby incorporated by reference herein.

BACKGROUND

I. Field

The present disclosure relates generally to communication, and more specifically to techniques for supporting operation of relay stations in wireless communication systems.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). The system may also include relay stations that can improve the coverage and capacity of the system without the need for a potentially expensive wired backhaul link. A relay station may be a "decode and forward" station that may receive a signal from an upstream station (e.g., a base station), process the received signal to recover data sent in the signal, generate a relay signal based on the recovered data, and transmit the relay signal to a downstream station (e.g., a UE).

A relay station may communicate with a base station on a backhaul link and may appear as a UE to the base station. The relay station may also communicate with one or more UEs on an access link and may appear as a base station to the UE(s). However, the relay station typically cannot transmit and receive at the same time on the same frequency channel. Hence, the backhaul and access links may be time division multiplexed. Furthermore, the system may have certain requirements that may impact the operation of the relay station. It may be desirable to support efficient operation of the relay station in light of its transmit/receive limitation as well as other system requirements.

SUMMARY

Various techniques for supporting operation of relay stations in wireless communication systems are described herein. In an aspect, a bitmap may be sent by a base station and/or a relay station to identify subframes of at least two types in a plurality of radio frames. For example, the bitmap may indicate whether each subframe covered by the bitmap is of a first type or a second type. A subframe of the first type may be a regular subframe carrying control information, a reference signal, and data. A subframe of the second type may be (i) a multicast/broadcast single frequency network (MBSFN) subframe carrying limited control information, limited reference signal, and possibly no data or (ii) a blank subframe carrying no control information, no reference signal, and/or no data. UEs may use the bitmap to control their operation. For example, a UE may perform channel estimation or measurement for the subframes of the first type and may skip channel estimation and measurement for the subframes of the second type.

In another aspect, a base station may transmit data and/or control information on resources not used by a relay station to transmit a reference signal. This may avoid interference to the reference signal from the relay station, which may improve performance for UEs communicating with the relay station.

Various other aspects and features of the disclosure are described in further detail below.

BRIEF DESCRIPTION OF THE DRAWINGS

FIGS. 15 and 16 show a process and an apparatus, respectively, for broadcasting subframe type information in a wireless communication system.

FIGS. 17 and 18 show a process and an apparatus, respectively, for performing channel estimation or measurement.

FIG. 23 shows a block diagram of a base station, a relay station, and a UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
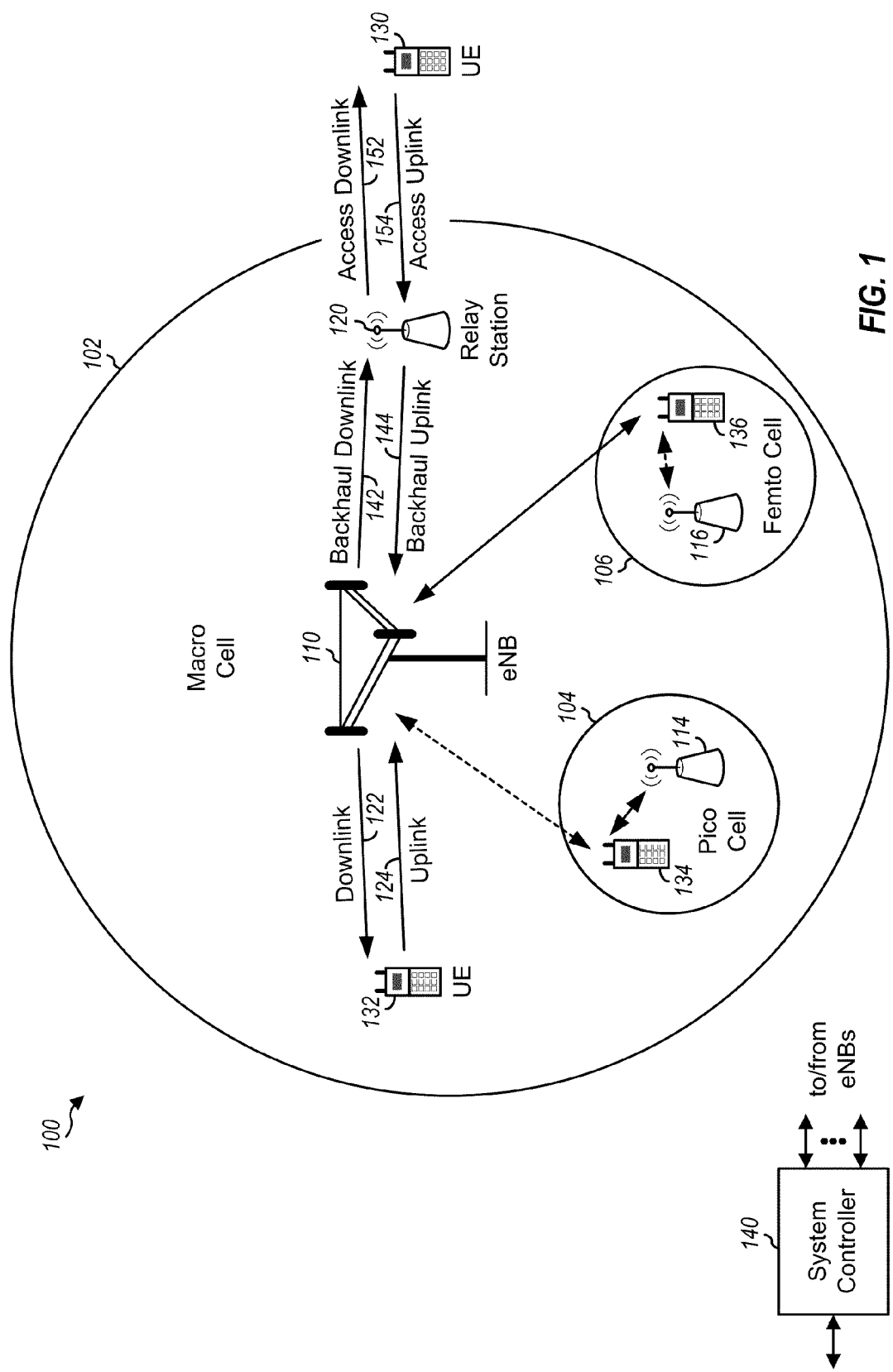
FIG. 1 shows a wireless communication system.

FIG. 1 shows a wireless communication system 100, which may be an LTE system or some other wireless system. System 100 may include a number of evolved Node Bs (eNBs), relay stations, and other system entities that can support communication for a number of UEs. An eNB may be a station that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB. In FIG. 1, an eNB 110 may be a macro eNB for a macro cell 102, an eNB 114 may be a pico eNB for a pico cell 104, and an eNB 116 may be a femto eNB for a femto cell 106. A system controller 140 may couple to a set of eNBs and may provide coordination and control for these eNBs.

A relay station 120 may be a station that receives a transmission of data and/or other information from an upstream station (e.g., eNB 110 or UE 130) and sends a transmission of the data and/or other information to a downstream station (e.g., UE 130 or eNB 110). A relay station may also be referred to as a relay, a relay eNB, etc. A relay station may also be a UE that relays transmissions for other UEs. In FIG. 1, relay station 120 may communicate with eNB 110 and UE 130 in order to facilitate communication between eNB 110 and UE 130.

UEs 130, 132, 134 and 136 may be dispersed throughout the system, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with eNBs and/or relay stations on the downlink and uplink. The downlink (or forward link) refers to the communication link from an eNB to a relay station or from an eNB or a relay station to a UE. The uplink (or reverse link) refers to the communication link from the UE to the eNB or relay station or from the relay station to the eNB. In FIG. 1, UE 132 may communicate with eNB 110 via a downlink 122 and an uplink 124. UE 130 may communicate with relay station 120 via an access downlink 152 and an access uplink 154. Relay station 120 may communicate with eNB 110 via a backhaul downlink 142 and a backhaul uplink 144.

In general, an eNB may communicate with any number of UEs and any number of relay stations. Similarly, a relay station may communicate with any number of eNBs and any number of UEs. For simplicity, much of the description below is for communication between eNB 110 and UE 130 via relay station 120.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The system may utilize FDD or TDD. For FDD, the downlink and uplink are allocated separate frequency channels. Downlink transmissions and uplink transmissions may be sent concurrently on the two frequency channels. For TDD, the downlink and uplink share the same frequency channel. Downlink and uplink transmissions may be sent on the same frequency channel in different time intervals.

Figure 2:
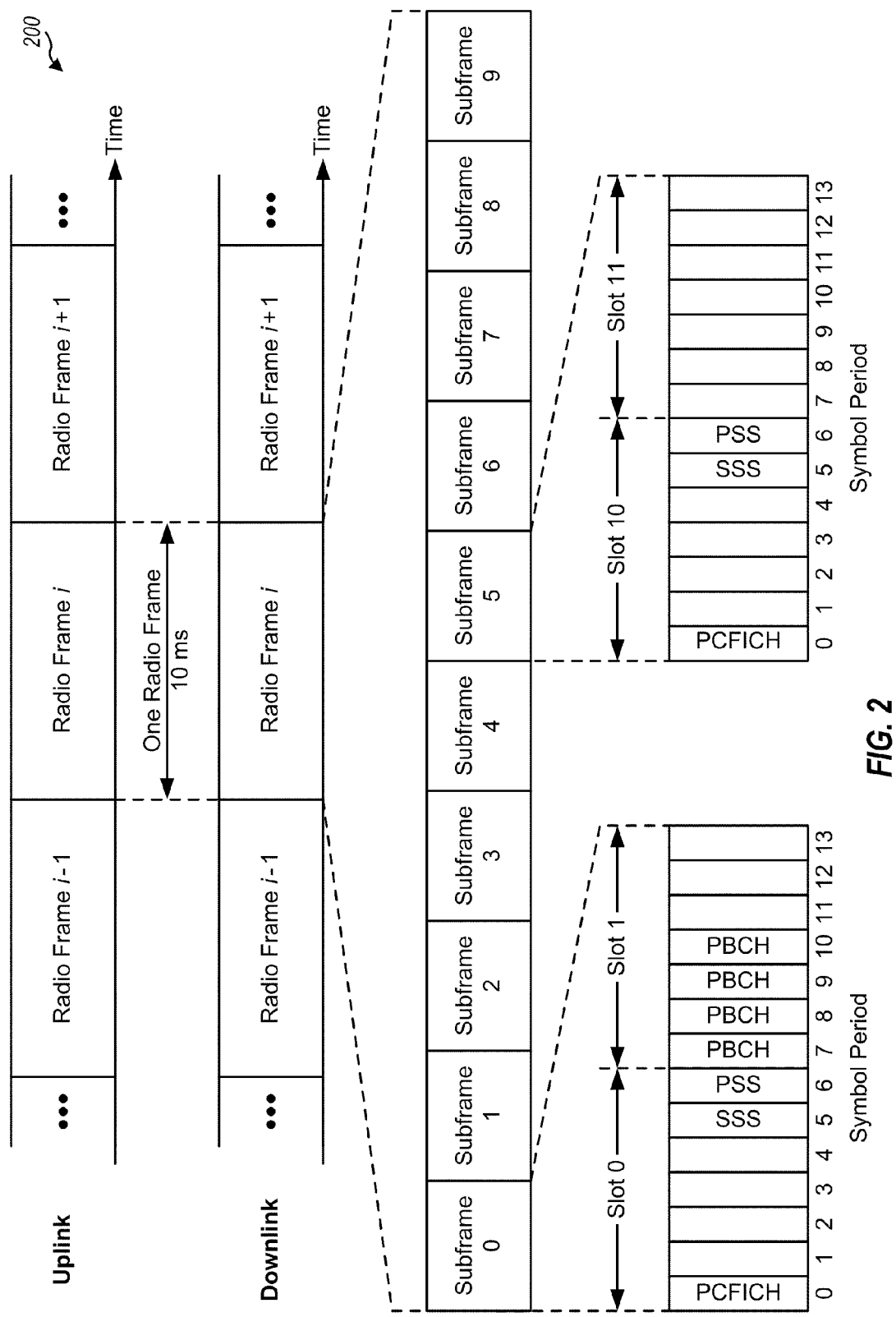
FIGS. 2 and 3 show exemplary frame structures for frequency division duplexing (FDD) and time division duplexing (TDD), respectively.

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. On the downlink, an OFDM symbol may be sent in each symbol period of a subframe. On the uplink, an SC-FDMA symbol may be sent in each symbol period of a subframe.

On the downlink in LTE, eNB 110 may transmit a primary synchronization signal (PSS) and a secondary synchronization signal (SSS) in the center 1.08 MHz of the system bandwidth for each cell in the eNB. The PSS and SSS may be sent in symbol periods 6 and 5, respectively, in subframes 0 and 5 of each radio frame with the normal cyclic prefix, as shown in FIG. 2. The PSS and SSS may be used by UEs for cell search and acquisition. eNB 110 may transmit a Physical Broadcast Channel (PBCH) in symbol periods 0 to 3 in slot 1 of subframe 0 in certain radio frames. The PBCH may carry some system information.

eNB 110 may transmit a Physical Control Format Indicator Channel (PCFICH) in the first symbol period of each subframe, as shown in FIG. 2. The PCFICH may convey the number of symbol periods (M) used for control channels in a subframe, where M may be equal to 1, 2, 3 or 4 and may change from subframe to subframe. eNB 110 may transmit a Physical HARQ Indicator Channel (PHICH) and a Physical Downlink Control Channel (PDCCH) in the first M symbol periods of each subframe (not shown in FIG. 2). The PHICH may carry information to support HARQ. The PDCCH may carry information for resource allocation for UEs and control information for downlink channels. The first M OFDM symbols of the subframe may be referred to as TDM control symbols. A TDM control symbol may be an OFDM symbol carrying control information. eNB 110 may transmit a Physical Downlink Shared Channel (PDSCH) in the remaining symbol periods of each subframe. The PDSCH may carry data for UEs scheduled for data transmission on the downlink.

Figure 3:
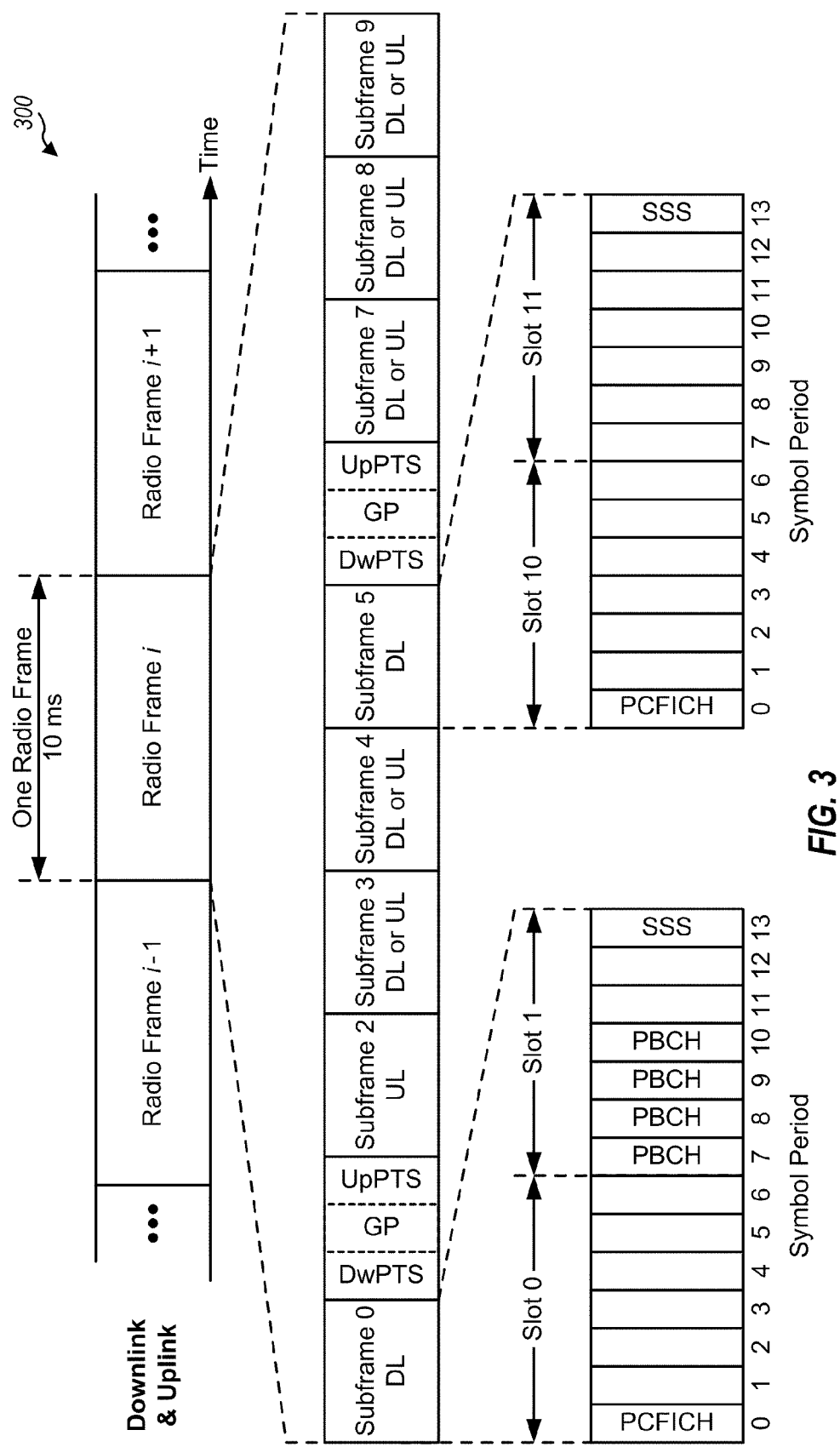

FIG. 3 shows a frame structure 300 used for TDD in LTE. LTE supports a number of downlink-uplink configurations for TDD. Subframes 0 and 5 are used for the downlink (DL) and subframe 2 is used for the uplink (UL) for all downlink-uplink configurations. Subframes 3, 4, 7, 8 and 9 may each be used for the downlink or uplink depending on the downlink-uplink configuration. Subframe 1 includes three special fields composed of a Downlink Pilot Time Slot (DwPTS) used for downlink control channels as well as data transmissions, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the downlink-uplink configuration. The DwPTS, GP and UpPTS may have different durations for different subframe configurations.

On the downlink, eNB 110 may transmit the PSS in symbol period 2 of subframes 1 and 6, the SSS in the last symbol period of subframes 0 and 5, and the PBCH in subframe 0 of certain radio frames. eNB 110 may also transmit the PCFICH, PHICH, PDCCH and PDSCH in each downlink subframe.

The various signals and channels in LTE are described in 3GPP TS 36.211, entitled "Evolved Universal Terrestrial Radio Access (E-UTRA); Physical Channels and Modulation," which is publicly available. Frame structures 200 and 300 are also described in 3GPP TS 36.211.

LTE supports transmission of unicast information to specific UEs. LTE also supports transmission of broadcast information to all UEs and multicast information to groups of UEs. A multicast/broadcast transmission may also be referred to as an MBSFN transmission. A subframe used for sending unicast information may be referred to as a regular subframe. A subframe used for sending multicast and/or broadcast information may be referred to as an MBSFN subframe.

Figure 4:
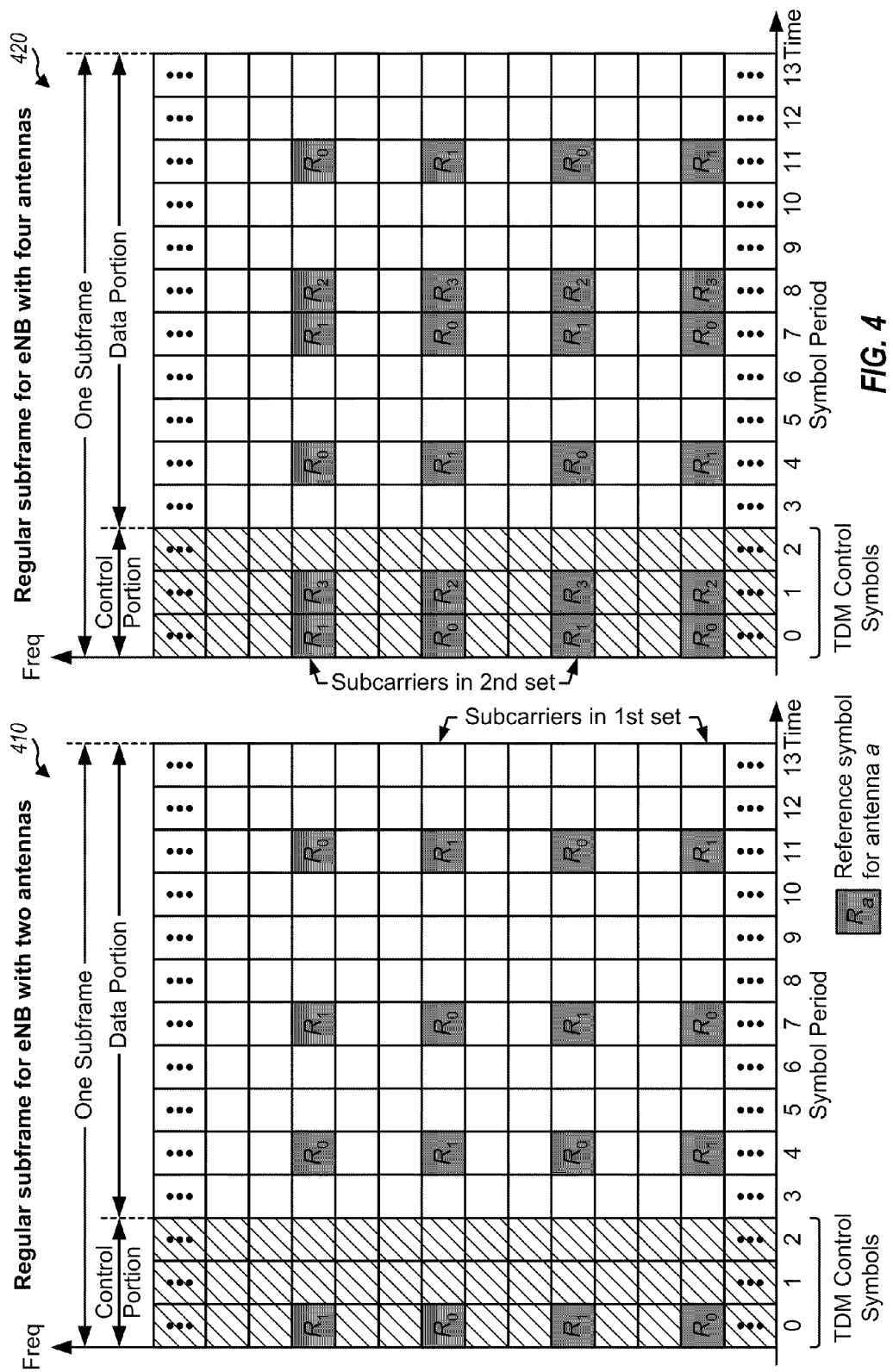
FIG. 4 shows two exemplary regular subframe formats.

FIG. 4 shows two exemplary regular subframe formats 410 and 420 for the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used by an eNB equipped with two antennas. A cell-specific reference signal may be sent in symbol periods 0, 4, 7 and 11 and may be used by UEs for channel estimation and measurement of channel conditions or quality. A reference signal is a signal that is known a priori by a transmitter and a receiver and may also be referred to as pilot. A cell-specific reference signal is a reference signal that is specific for a cell, e.g., generated with one or more symbol sequences determined based on a cell identity (ID). For simplicity, a cell-specific reference signal may be referred to as simply a reference signal. In FIG. 4, for a given resource element with label $R_a$, a reference symbol may be sent on that resource element from antenna a, and no modulation symbols may be sent on that resource element from other antennas. Subframe format 420 may be used by an eNB equipped with four antennas. A reference signal may be sent in symbol periods 0, 1, 4, 7, 8 and 11.

In the example shown in FIG. 4, three TDM control symbols are sent in a regular subframe with M=3. The PCFICH may be sent in symbol period 0, and the PDCCH and PHICH may be sent in symbol periods 0 to 2. The PDSCH may be sent in the remaining symbol periods 3 to 13 of the subframe.

Figure 5:
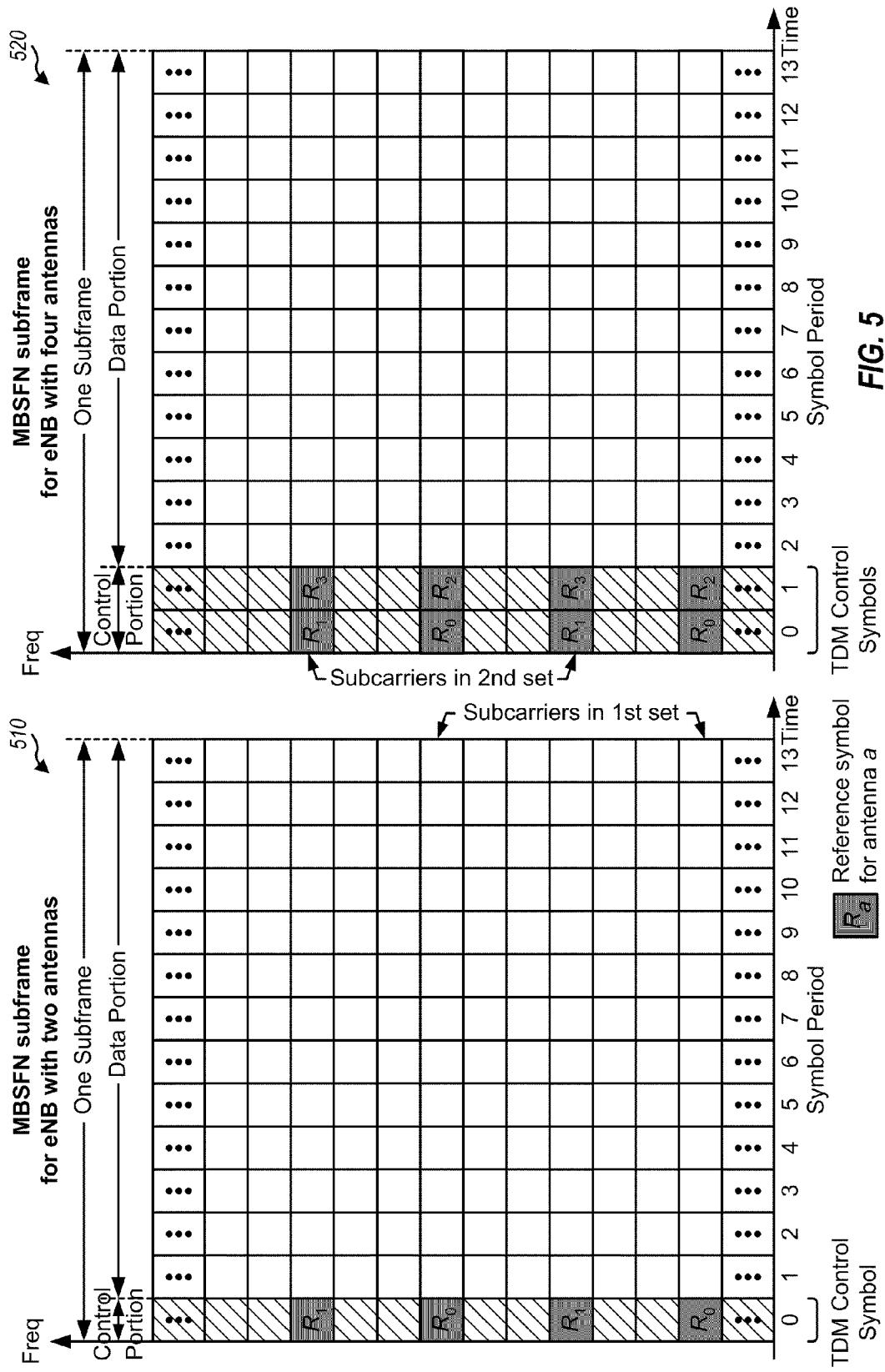
FIG. 5 shows two exemplary MBSFN subframe formats.

FIG. 5 shows two exemplary MBSFN subframe formats 510 and 520 for the normal cyclic prefix. Subframe format 510 may be used by an eNB equipped with two antennas. A reference signal may be sent in symbol period 0. For the example shown in FIG. 5, M=1 and one TDM control symbol is sent in the MBSFN subframe. Subframe format 520 may be used by an eNB equipped with four antennas. A reference signal may be sent in symbol periods 0 and 1. For the example shown in FIG. 5, M=2 and two TDM control symbols are sent in the MBSFN subframe.

In general, the PCFICH may be sent in symbol period 0 of an MBSFN subframe, and the PDCCH and PHICH may be sent in symbol periods 0 to M−1. Broadcast/multicast information may be sent in symbol periods M through 13 of the MBSFN subframe. Alternatively, no transmissions may be sent in symbol periods M through 13. An eNB may transmit MBSFN subframes with a periodicity of 10 ms, e.g., in subframe t of every radio frame. The eNB may broadcast system information indicating which subframes are MBSFN subframes.

In general, an MBSFN subframe is a subframe that carries a limited reference signal and limited control information in a control portion of the subframe and may or may not carry multicast/broadcast data in a data portion of the subframe. A station (e.g., an eNB or a relay station) may declare a subframe as an MBSFN subframe (e.g., via system information) to UEs. These UEs may then expect the reference signal and control information in the control portion of the MBSFN subframe. The station may separately inform a UE (e.g., via upper layer signaling) to expect broadcast data in the data portion of the MBSFN subframe, and the UE would then expect broadcast data in the data portion. The station may elect to not inform any UE to expect broadcast data in the data portion of the MBSFN subframe, and the UEs would not expect broadcast data in the data portion. These characteristics of the MBSFN subframe may be exploited to support relay operation, as described below.

FIGS. 4 and 5 show some subframe formats that may be used for the downlink. Other subframe formats may also be used, e.g., for more than two antennas.

Figure 6:
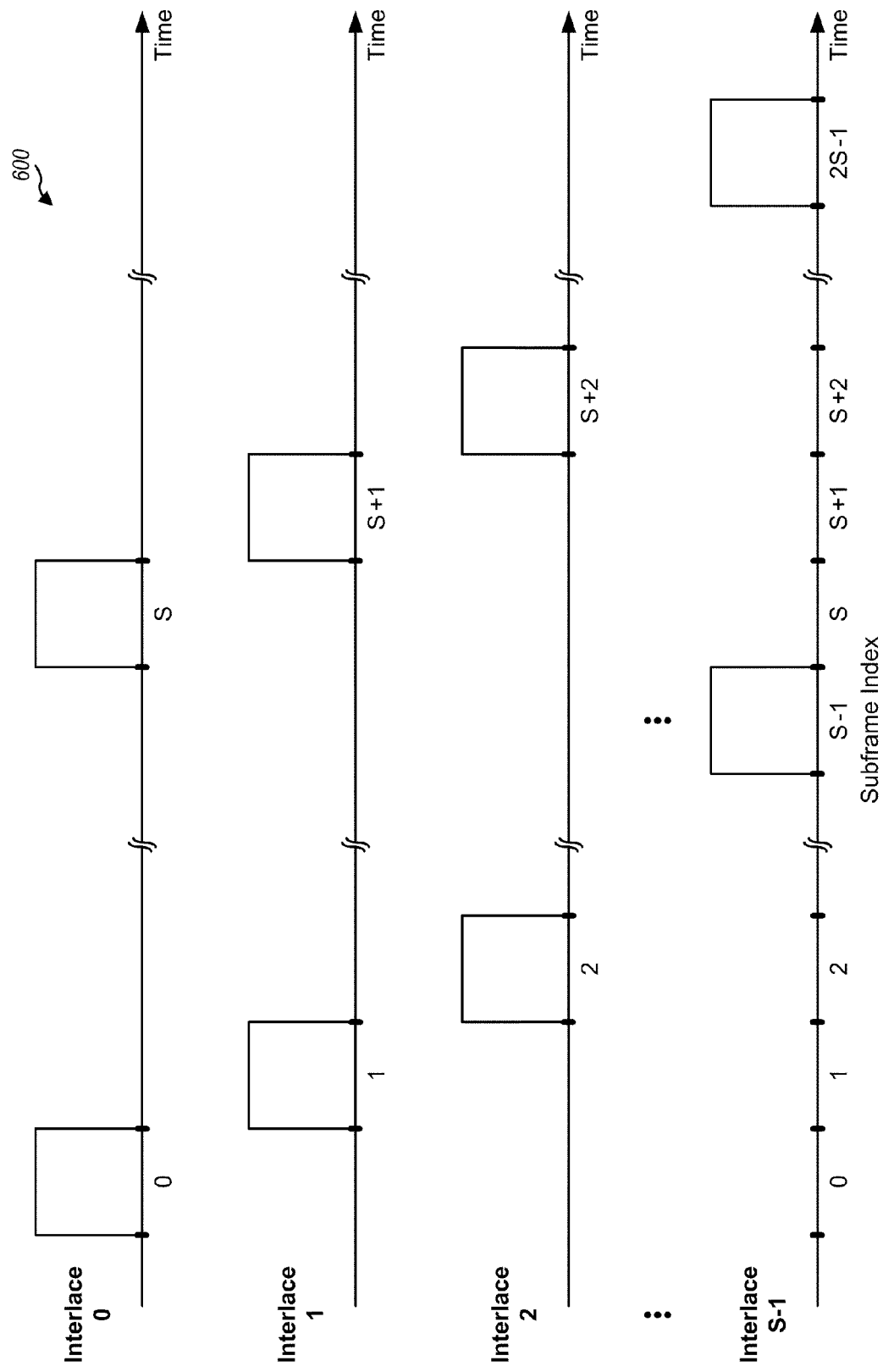
FIG. 6 shows an exemplary interlace structure.

FIG. 6 shows an exemplary interlace structure 600. For FDD, interlace structure 600 may be used for each of the downlink and uplink. For TDD, interlace structure 600 may be used for both the downlink and uplink. As shown in FIG. 6, S interlaces with indices of 0 through S−1 may be defined, where S may be equal to 6, 8, 10, or some other value. Each interlace may include subframes that are spaced apart by S frames. In particular, interlace s may include subframes s, s+S, s+2S, etc., where $s \in \{0, \ldots, S-1\}$. The interlaces may also be referred to as HARQ interlaces.

The system may support HARQ for data transmission on the downlink and uplink. For HARQ, a transmitter may send one or more transmissions of a packet until the packet is decoded correctly by a receiver or some other termination condition is encountered. A modulation and coding scheme (MCS) may be selected for the packet such that it can be decoded correctly after a particular number of transmissions, which may be referred to as a target termination. For synchronous HARQ, all transmissions of the packet may be sent in subframes of a single interlace. For asynchronous HARQ, each transmission of the packet may be scheduled and sent in any subframe.

Figure 7A:
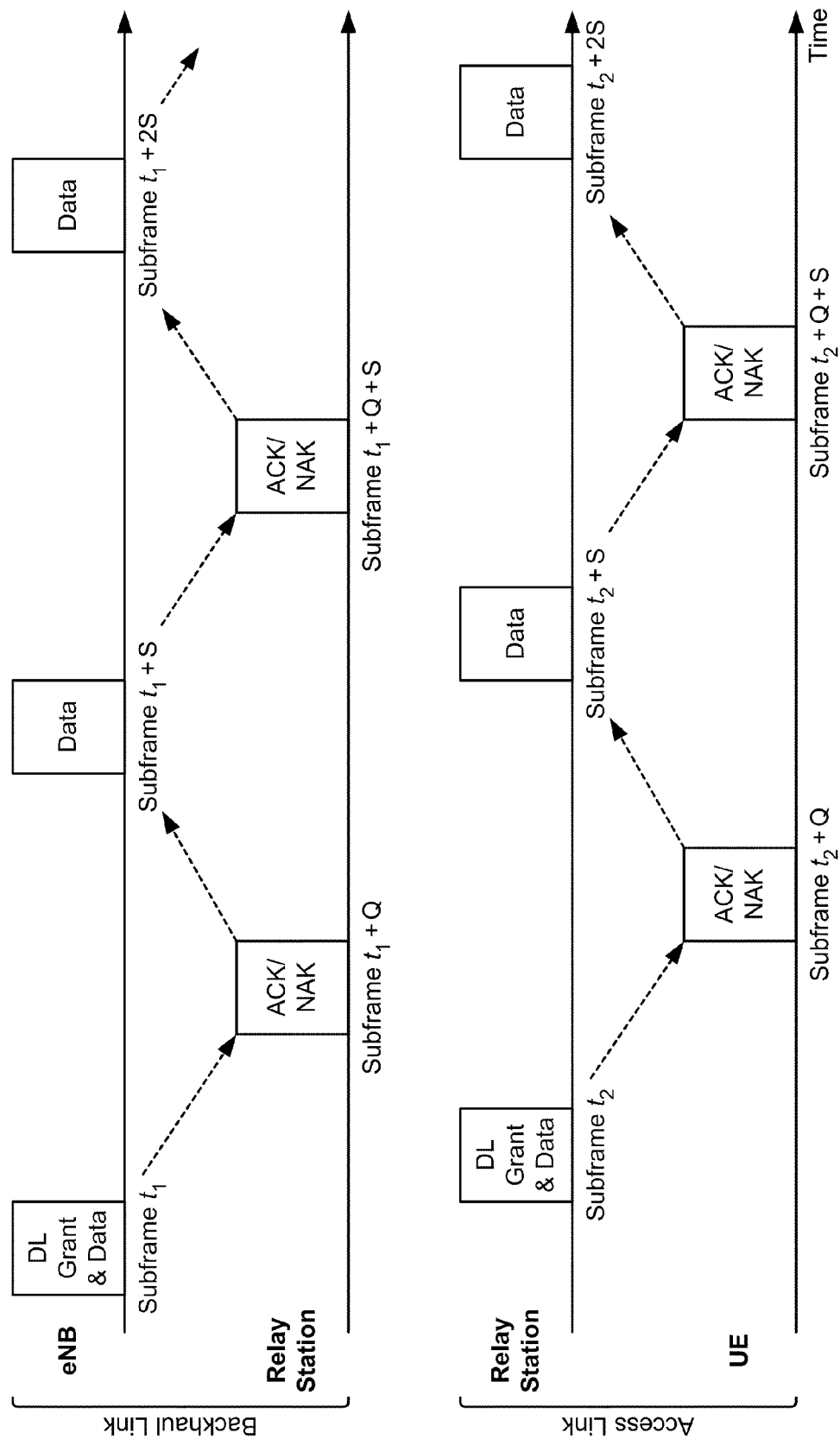
FIG. 7A shows data transmission on the downlink via a relay station.

FIG. 7A shows data transmission on the downlink with HARQ via relay station 120. eNB 110 may have data to send to UE 130 and may schedule UE 130 for data transmission on the downlink. eNB 110 may send a downlink (DL) grant and data on the backhaul link in subframe $t_1$. The downlink grant may indicate the assigned resources, the selected modulation and coding scheme (MCS), etc. Relay station 120 may receive the downlink grant and data transmission from eNB 110 and may process the data transmission in accordance with the downlink grant. Depending on the decoding result, relay station 120 may send an acknowledgement (ACK) or a negative acknowledgement (NAK) in subframe $t_1+Q$, where Q is the delay for an HARQ response. eNB 110 may retransmit the data in subframe $t_1+S$ if a NAK is received and may transmit new data if an ACK is received, where S is the number of subframes in an interlace. Data transmission by eNB 110 and ACK/NAK feedback by relay station 120 for the backhaul link may continue in similar manner.

For the access link, relay station 120 may send the downlink grant and data in subframe $t_2$, which may be offset from subframe $t_1$ by a suitable amount. For example, subframe $t_2$ may be a subframe in which relay station 120 has successfully decoded the data intended for UE 130 from eNB 110. UE 130 may receive the downlink grant and data transmission from relay station 120, process the data transmission in accordance with the downlink grant, and send an ACK or a NAK in subframe $t_2+Q$. Relay station 120 may retransmit the data in subframe $t_2+S$ if a NAK is received and may transmit new data if an ACK is received. Data transmission by relay station 120 and ACK/NAK feedback by UE 130 for the access link may continue in similar manner.

Figure 7B:
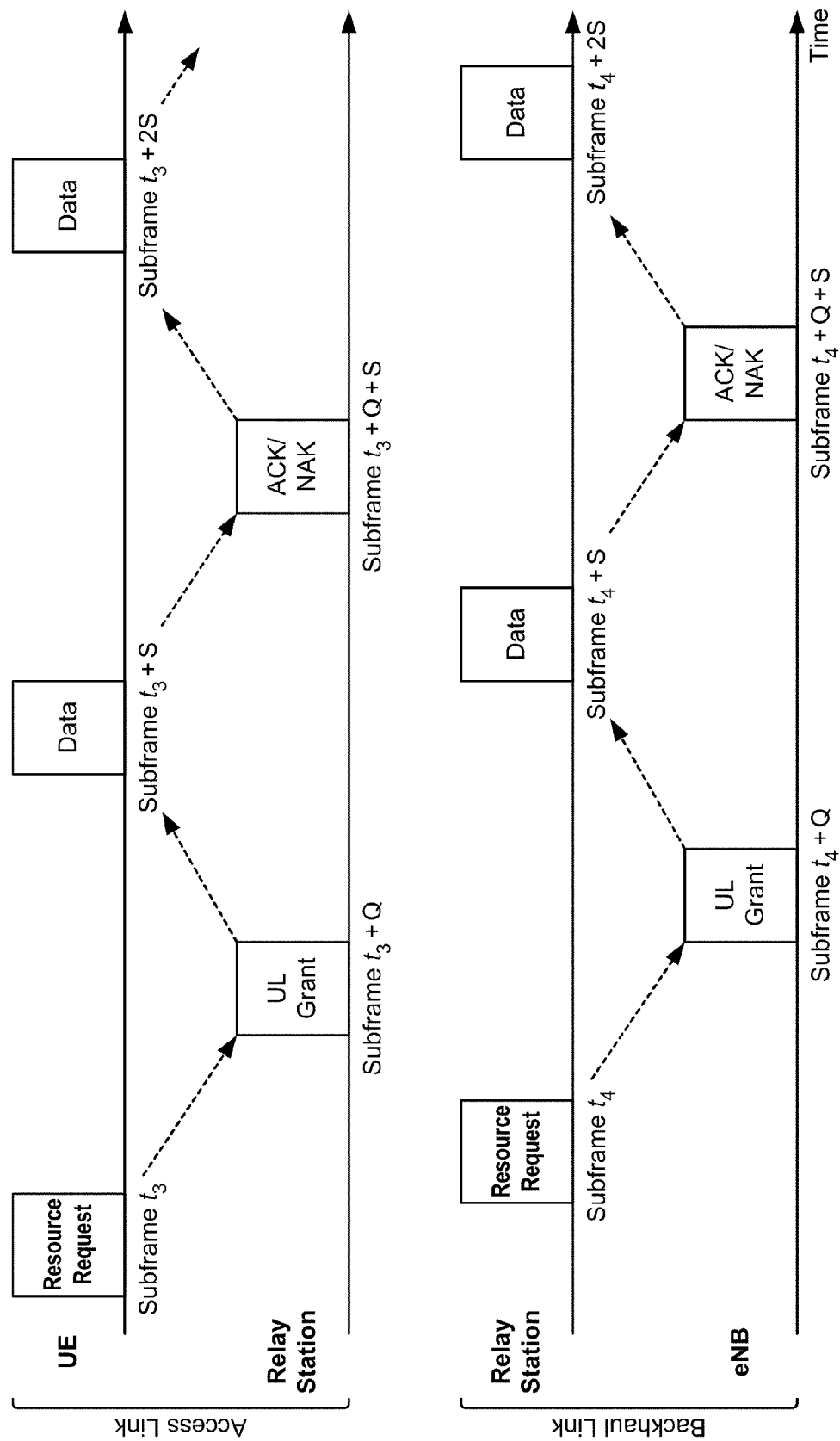
FIG. 7B shows data transmission on the uplink via a relay station.

FIG. 7B shows data transmission on the uplink with HARQ via relay station 120. UE 130 may have data to send on the uplink and may send a resource request in subframe $t_3$. Relay station 120 may receive the resources request, schedule UE 130 for data transmission on the uplink, and send an uplink (UL) grant in subframe $t_3+Q$. UE 130 may send a data transmission in accordance with the uplink grant in subframe $t_3+S$. Relay station 120 may process the data transmission from UE 130 and may send an ACK or a NAK in subframe $t_3+Q+S$ depending on the decoding result. UE 130 may retransmit the data in subframe $t_3+2S$ if a NAK is received and may transmit new data if an ACK is received. Data transmission by UE 130 and ACK/NAK feedback by relay station 120 for the access link may continue in similar manner.

For the backhaul link, relay station 120 may send a resource request in subframe $t_4$. eNB 110 may receive the resources request, schedule relay station 120 for data transmission on the uplink, and send an uplink grant in subframe $t_4+Q$. Relay station 120 may send a data transmission in accordance with the uplink grant in subframe $t_4+S$. eNB 110 may process the data transmission from relay station 120 and may send an ACK or a NAK in subframe $t_4+Q+S$. Relay station 120 may retransmit the data or transmit new data in subframe $t_4+2S$ depending on whether ACK or NAK was received. Data transmission by relay station 120 and ACK/NAK feedback by eNB 110 for the backhaul link may continue in similar manner.

FIGS. 7A and 7B show synchronous HARQ in which data may be sent in evenly spaced subframes, and ACK information may be sent at a fixed offset Q from the subframes used to send data. For FDD in LTE, S may be equal to 8, and Q may be equal to 4. Data may be sent in subframes in one interlace, which may be spaced apart by 8 subframes. For TDD in LTE, S may be equal to 10, and Q may be variable and dependent on the selected downlink-uplink configuration. S and Q may also have other values. For asynchronous HARQ, data may be sent in any subframe, and ACK information may be sent at a fixed or variable offset from the subframe used to send data. S and Q may be different for different transmissions of data with asynchronous HARQ and also with TDD.

A number of HARQ processes may be defined for each link. An HARQ process may carry all transmissions of a packet on a given interlace until the packet is decoded correctly and may then carry transmissions of another packet. A new packet may be sent on an HARQ process when that process becomes available.

1. Use of Blank Subframes or 8 ms MBSFN Subframes

Relay station 120 typically cannot transmit and receive on the same frequency channel at the same time. Hence, some of the available subframes may be allocated for the backhaul link and may be referred to as backhaul subframes. The remaining subframes may be allocated for the access link and may be referred to as access subframes. Relay station 120 may communicate with eNB 110 in the backhaul subframes and may communicate with UE 130 in the access subframes.

In an aspect, relay station 120 may configure the backhaul subframes as blank subframes on the access link. In one design, a blank subframe may include no transmissions, i.e., no reference signal, no control information, and no data. Relay station 120 may transmit nothing in each blank subframe in order to be able to listen to eNB 110 on the backhaul downlink. Relay station 120 may transmit the blank subframes with a periodicity of S subframes to match the periodicity of data sent with HARQ. In one design, S may be equal to 8 subframes (or 8 ms) for FDD or may be equal to 10 subframes (or 10 ms) for TDD. eNB 110 may also configure the access subframes as blank subframes. eNB 110 may transmit nothing in each blank subframe in order to avoid causing interference on the downlink. UE 130 may then observe less interference from eNB 110 during the blank subframes of eNB 110.

Blank subframes may be used to support relay operation. Blank subframes may also be used for other purposes such as interference management for range extension and restricted association. Range extension is a scenario in which a UE connects to an eNB with lower pathloss among all eNBs detected by the UE. This may lead to a situation in which the UE connects to an eNB with weaker signal than some other eNBs. For example, in FIG. 1, UE 134 may connect to pico eNB 114 with lower pathloss and lower received signal quality and may observe high interference from macro eNB 110. For range extension, macro eNB 110 may reserve a set of subframes that may be used by pico eNB 114 to send data to UE 134. Macro eNB 110 may configure the reserved subframes as blank subframes. Pico eNB 114 may also declare the subframes used by macro eNB 110 as blank subframes so that UE 134 will not measure high interference from macro eNB 110.

Restricted association is a scenario in which a UE may be close to a femto eNB but may be unable to access the femto eNB (e.g., due to the femto eNB belonging to another user). The UE may then connect to another eNB with lower received power. For example, in FIG. 1, UE 136 may close to femto eNB 116 but may be unable to access femto eNB 116. UE 136 may then connect to macro eNB 110 and may observe high interference from femto eNB 116. Femto eNB 116 may transmit some blank subframes to avoid causing interference to UE 136. UE 136 may then communicate with macro eNB 110 in the blank subframes.

Blank subframes may also be used to transmit new control channels to support technologies such as network multiple-input multiple-output (MIMO), higher order MIMO, etc. Network MIMO refers to transmission from multiple cells to one or multiple UEs. For network MIMO, some subframes may be advertised as blank subframes to legacy UEs and would not be used by the legacy UEs for channel estimation, interference estimation, measurements, or other purposes. Transmissions for network MIMO may be sent in these subframes and would not impact the legacy UEs.

LTE currently supports MBSFN subframes with a periodicity of 10 ms for FDD. LTE also currently supports synchronous HARQ with a periodicity of 8 ms. The MBSFN subframes may not be aligned with subframes used for data transmission. For example, MBSFN subframes may be declared for subframes 0, 10, 20, etc., and data may be sent with HARQ in subframes 0, 8, 16, etc.

In another aspect, MBSFN subframes with a periodicity of 8 ms may be supported for FDD to match the periodicity of data sent with HARQ. The LTE standard may be changed to support 8 ms MBSFN subframes and/or other suitable value of S to match the periodicity of data.

Relay station 120 may use some interlaces for the backhaul link and may use the remaining interlaces for the access link. The subframes in the interlaces for the backhaul link may be declared as MBSFN subframes. In some cases, relay station 120 may deviate from the normal partitioning. For example, relay station 120 may transmit the PSS, SSS, and PBCH in certain subframes (e.g., subframes 0 and 5 in FDD) that may be part of the interlaces allocated to the backhaul link. Relay station 120 may use regular subframes instead of MBSFN subframes for these subframes. In one design, relay station 120 may transmit only the PSS and SSS in the regular subframes used for subframes 0 and 5. In another design, relay station 120 may transmit the TDM control symbols as well as the PSS and SSS in the regular subframes used for subframes 0 and 5.

In another aspect, a bitmap may be used to convey different types of subframes used by relay station 120 or eNB 110. In general, the bitmap may cover any duration, e.g., any number of radio frames. The bitmap may indicate the type of each subframe covered by the bitmap.

Figure 8:
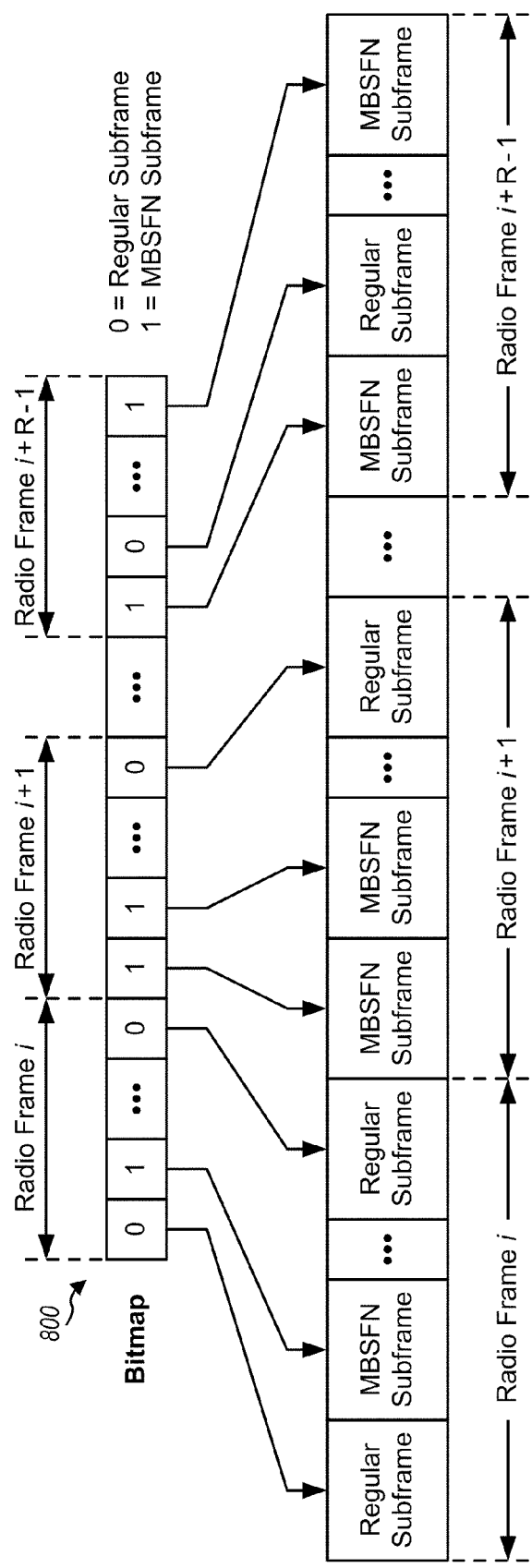
FIG. 8 shows a bitmap conveying subframes of different types.

FIG. 8 shows a design of a bitmap 800 for R radio frames i through i+R−1, where R may be equal to 2, 4, etc. The bitmap may include one bit for each subframe covered by the bitmap. The bit for each subframe may be set to a first value (e.g., '0') to indicate a regular subframe or to a second value (e.g., '1') to indicate an MBSFN subframe. The second value may also indicate a blank subframe if it is used instead of an MBSFN subframe. The bitmap can flexibly allow each subframe to be set to one of the supported subframe types. In one design, the bitmap may cover four radio frames and may include 40 bits for 40 subframes. The bitmap may be sent via a broadcast channel (e.g., the PBCH) or some other channel.

In another design, subframes may be allocated in units of interlaces. The interlace(s) with subframes designated as MBSFN subframes (or as blank subframes) may be conveyed via the broadcast channel. The subframes designated as MBSFN subframes (or as blank subframes) may also be conveyed in other manners.

The blank subframes and/or MBSFN subframes may be conveyed to UEs via signaling, e.g., a bitmap. The UEs may be aware of the blank subframes and/or MBSFN subframes. The UEs may not expect reference signals in the blank subframes and may expect limited reference signals in the MBSFN subframes. The UEs may not use the blank subframes for (intra-frequency and inter-frequency) measurement, channel estimation, and interference estimation. The UEs may perform measurement, channel estimation, and interference estimation based on regular subframes. The UEs may or may not use the MBSFN subframes for measurement, channel estimation, and interference estimation. The UEs may perform channel estimation based on the reference signals in the regular subframes and possibly the MBSFN subframes.

The UEs may perform interference estimation based on an appropriate portion of the regular subframes and possibly the MBSFN subframes. Interference may vary (i) across an MBSFN subframe due to the TDM structure of TDM control symbols within the MBSFN subframe and (ii) between MBSFN subframes and other subframes due to the TDM structure of the MBSFN subframes. The UEs may perform interference estimation by taking into account the variation in interference. For example, if a UE knows that OFDM symbol 0 has higher interference than other OFDM symbols, then the UE may estimate interference separately for OFDM symbol 0 and the other OFDM symbols. The UE may perform interference estimation based on the reference signal. The UE may obtain an interference estimate for OFDM symbol 0 using only the reference signal in OFDM symbol 0. The UE may obtain an interference estimate for the other OFDM symbols using the reference signal sent in these OFDM symbols.

2. MBSFN Subframes & Time Offset eNB 110 may transmit TDM control symbols in the first M symbol periods of each subframe. Relay station 120 may also transmit TDM control symbols in the first M symbol periods of each subframe. Relay station 120 may not be able to simultaneously receive the TDM control symbols from eNB 110 and transmit its TDM control symbols to its UEs.

In another aspect, the timing of relay station 120 may be offset by N symbol periods from the timing of eNB 110, where N may be any suitable value. The timing offset may be selected such that the TDM control symbols and/or the reference signal of relay station 120 do not overlap with those of eNB 110.

Figure 9:
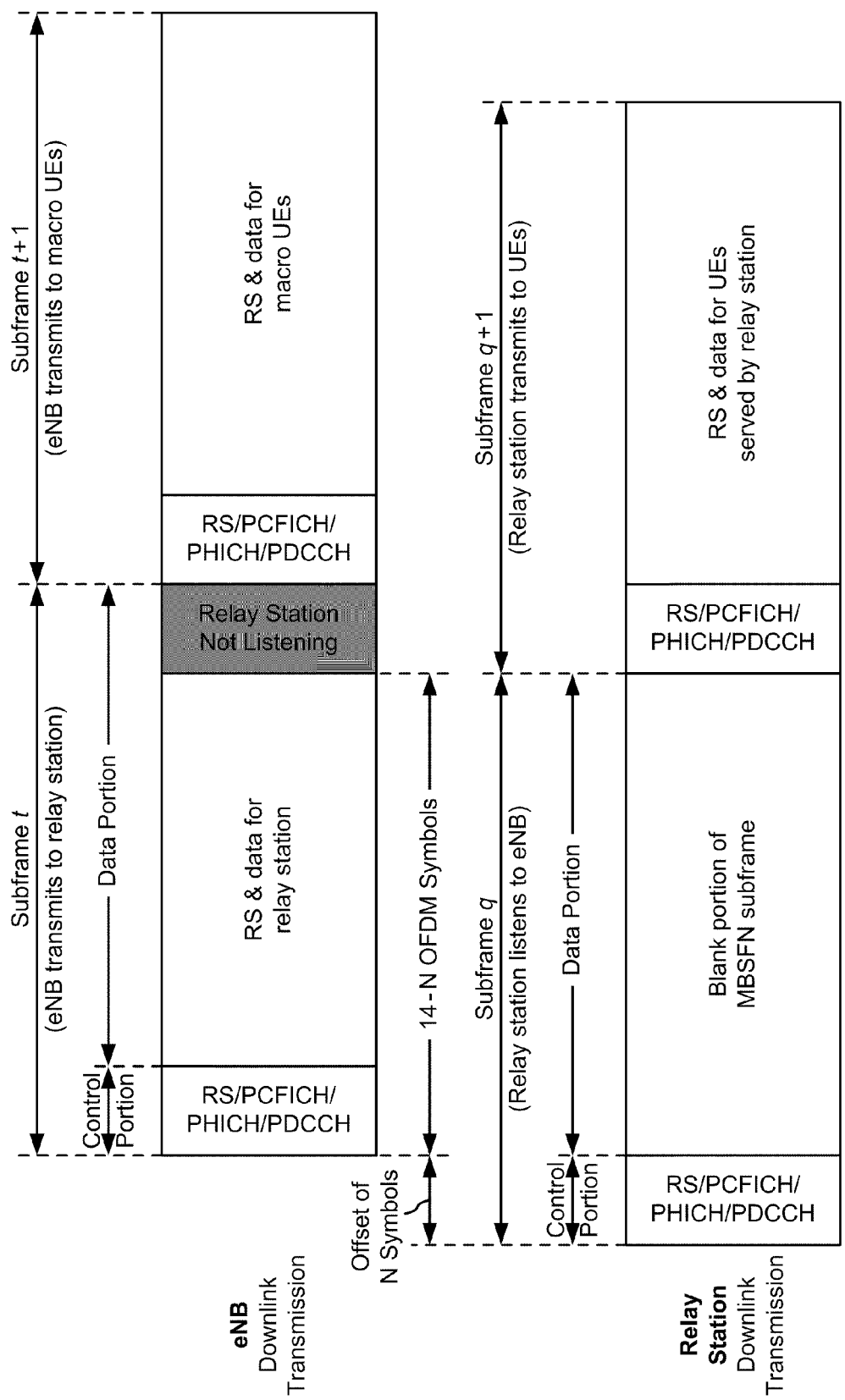
FIG. 9 shows symbol timing offset between a base station and a relay station.

FIG. 9 shows a design of symbol timing offset between eNB 110 and relay station 120. In general, the timing of relay station 120 may be advanced (as shown in FIG. 9) or delayed by N symbol periods relative to the timing of eNB 110. The timing offset may enable relay station 120 to receive the TDM control symbols from eNB 110.

eNB 110 may transmit the reference signal (RS) and data to relay station 120 in subframe t of eNB 110. Relay station 120 may behave as a UE in subframe q of relay station 120 and may not transmit the reference signal, control information, and/or data to its UEs. Relay station 120 may configure its subframe q as an MBSFN subframe and may transmit one or more TDM control symbols in subframe q. This may reduce the number of symbols in which relay station 120 needs to transmit reference to its UEs and may allow relay station 120 to listen to more symbols transmitted by eNB 110 in subframe t. The MBSFN subframe may allow for selection of more efficient timing offset between relay station 120 and eNB 110.

As shown in FIG. 9, relay station 120 may receive only the first 14−N OFDM symbols from eNB 110 in subframe t since it may transmit its TDM control symbol(s), reference signal, and/or data during the last N OFDM symbols in subframe t (which corresponds to subframe q+1 of relay station 120). Relay station 120 may transmit a single TDM control symbol with MBSFN subframe format 510 in FIG. 5, and N may be equal to one. In one design, on the downlink, eNB 110 may send data and reference signal to relay station 120 within the first 14−N OFDM symbols of subframe t. An interleaving scheme may interleave data sent to relay station 120 across the first 14−N OFDM symbols (instead of all 14 OFDM symbols). Similarly, on the uplink, relay station 120 may send data to eNB 110 in 14−N OFDM symbols (instead of all 14 OFDM symbols). An interleaving scheme may spread the data sent by relay station 120 over 14−N OFDM symbols. For both the downlink and uplink, interleaving over 14−N OFDM symbols with a timing offset of N symbol periods may improve data performance.

In one design, consecutive subframes may be used for communication between eNB 110 and relay station 120. This may result in N OFDM symbols being lost in only one subframe instead of in each subframe. For example, if relay station 120 marks K consecutive subframes as blank subframes and has an timing advance of N symbols, then there are K−1 subframes of eNB 110 during which relay station 120 does not transmit any reference signals, control information, or data and may then be able to listen to eNB 110 in all symbol periods. In the subframe following these K−1 subframes, relay station 120 may transmit in the last N OFDM symbols and hence may be able to listen to only 14−N symbols. If relay station 120 marks the K subframes as MBSFN subframes instead of blank subframes and transmits on only one TDM control symbol in each MBSFN subframe, then it may lose N OFDM symbols in the last subframe and one OFDM symbol in the other K−1 subframes.

If MBSFN subframes with periodicity of 8 ms are supported, then eNB 110 may transmit in accordance with 8 ms HARQ timeline to relay station 120. Relay station 120 may declare MBSFN subframes for subframes in which eNB 110 transmits to relay station 120. If MBSFN subframes with periodicity of 10 ms are supported, then eNB 110 may transmit in accordance with 10 ms HARQ timeline to relay station 120. eNB 110 may then ensure that resources (e.g., for downlink and uplink control, data, etc.) for 8 ms UEs and 10 ms relay stations do not collide. For uplink control resources, eNB 110 may use different offsets for demodulation reference signals (DMRS) from relay stations and UEs. Alternately, the relay stations and UEs may be frequency division multiplexed (FDM).

MBSFN subframes or blank subframes and time offset may be used to support relay operation, as described above. MBSFN subframes or blank subframes and time offset may also be used for interference management, e.g., for range extension and restricted association.

3. MBSFN Subframes & New Control Channels

In another aspect, eNB 110 may transmit new control channels, reference signal, and data to relay station 120 during the time that relay station 120 is not transmitting. This may then allow relay station 120 to receive the control channels. Relay station 120 may configure such subframes as MBSFN subframes so that it can transmit only the TDM control symbols and can use the remaining symbols to listen to eNB 110.

Figure 10:
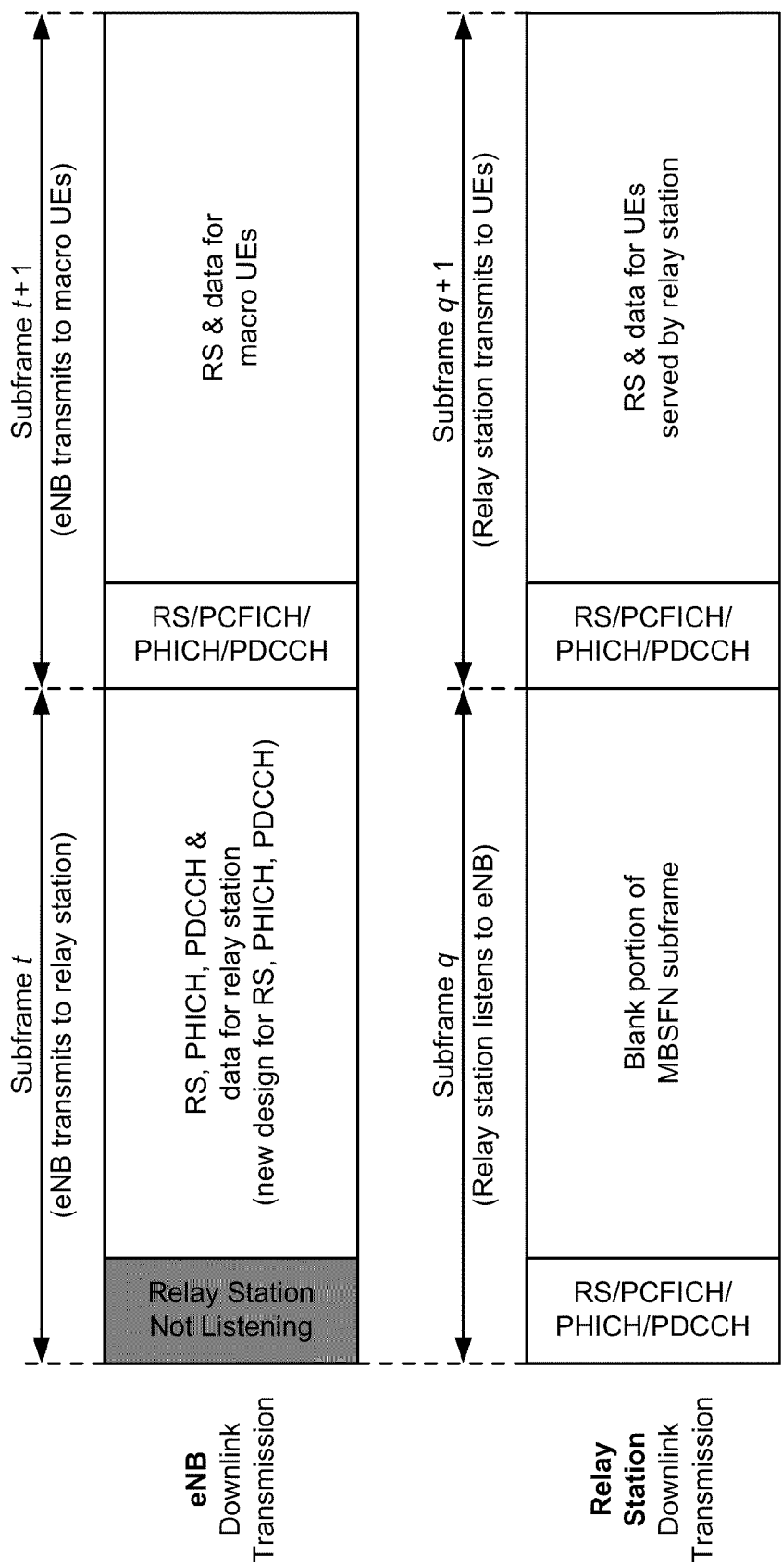
FIG. 10 shows downlink transmissions with new control channels.

FIG. 10 shows a design of downlink transmissions by eNB 110 with new control channels. eNB 110 may transmit to relay station 120 in subframe t and to its UEs in subframe t+1. Relay station 120 may receive from eNB 110 in subframe t (which may correspond to subframe q of relay station 120) and may transmit to its UEs in subframe t+1 (which may correspond to subframe q+1 of relay station 120). The timing of relay station 120 may be aligned with the timing of eNB 110.

In the design shown in FIG. 10, eNB 110 may or may not transmit TDM control symbols in the first M symbol periods of subframe t. eNB 110 may transmit new control channels as well as data in the remaining symbol periods of subframe t to relay station 120. A default value (e.g., M=3) may be assumed for the PCFICH, or the PCFICH may be sent as one of the control channels. eNB 110 may also transmit a reference signal (RS) using the format for a regular subframe (e.g., as shown in FIG. 4) or a new format. eNB 110 may also serve other UEs and/or other relay stations in subframe t. Relay station 120 may transmit its TDM control symbols in the first M symbol periods of subframe t, e.g., using an MBSFN subframe format. Relay station 120 may then switch to receive the transmissions from eNB 110 in the remaining symbol periods of subframe t.

eNB 110 may transmit to relay station 120 in subframes that relay station 120 is mandated to transmit. For example, eNB 110 may transmit in subframes 0 and 5 of relay station 120, which may transmit the PSS and SSS. eNB 110 may then transmit the control channels and data to relay station 120 in OFDM symbols in which relay station 120 is not transmitting. eNB 110 may be aware of mandated transmissions by relay station 120 and can thus avoid transmitting to relay station 120 during these mandated transmissions.

MBSFN subframes and new control channels may also be used for interference management (e.g., for range extension and restricted association) and to support technologies such as network MIMO. For example, a dominant interferer may configure a few subframes as MBSFN subframes. In these subframes, a weaker eNB can communicate with its UEs in symbol periods not used by the dominant interferer.

4. Mechanisms for Dealing with Subframes 0 and 5

Relay station 120 may have various restrictions that may impact its operation. For example, relay station 120 may communicate with eNB 110 via the backhaul downlink and uplink and may also communicate with UE 130 via the access downlink and uplink, as shown in FIG. 1. Since relay station 120 typically cannot transmit and receive on the same frequency channel at the same time, the backhaul link and the access link may be time division multiplexed. Relay station 120 may then be able to communicate on only the backhaul link or the access link in each subframe.

LTE supports asynchronous HARQ on the downlink and synchronous HARQ on the uplink. For HARQ, a transmission of data may be sent in subframe t and may be received in error. A retransmission of the data may be sent in any subframe for asynchronous HARQ or in a specific subframe (e.g., subframe t+8) for synchronous HARQ. Synchronous HARQ may thus restrict which subframes can be used for retransmissions.

Relay station 120 may declare backhaul subframes as MBSFN subframes or as blank subframes. This may allow relay station 120 to transmit a minimum amount of control information and reference signal, as shown in FIG. 5. However, the MBSFN subframes may be restricted to a periodicity of 10 ms (if 8 ms MBSFN subframes are not supported, as in LTE Release 8). Relay station 120 may be required to transmit the PSS and SSS in subframes 0 and 5. The various restrictions on relay station 120 may be addressed in several manners.

Figure 11:
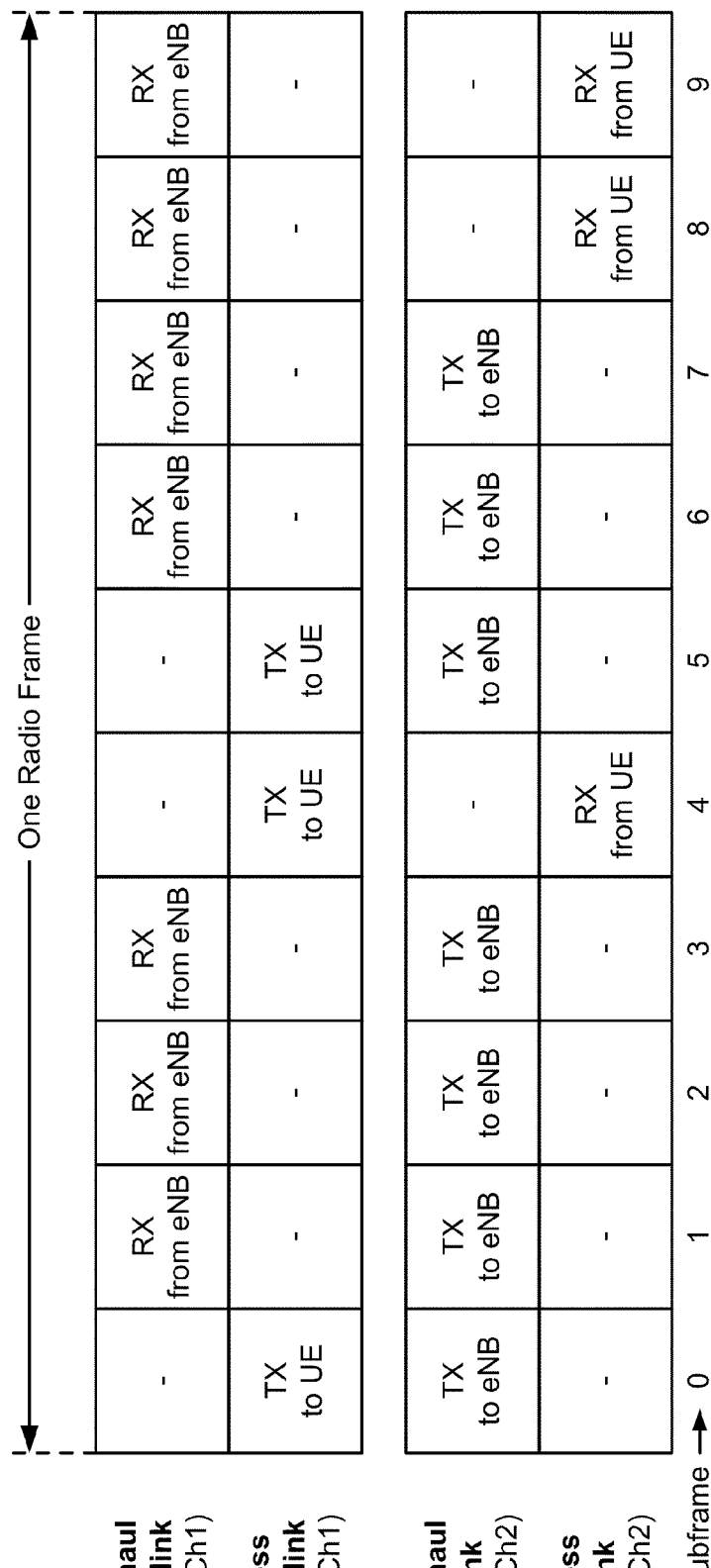
FIG. 11 shows communication by a relay station.

FIG. 11 shows a design of communication by relay station 120 with a 10 ms timeline. In this design, relay station 120 may have some backhaul subframes in each radio frame for communication with eNB 110 and some access subframes in each radio frame for communication with UE 130. Subframes 0 and 5 may be access subframes to allow relay station 120 to transmit the PSS and SSS in these subframes. Relay station 120 may transmit to and/or receive from eNB 110 in each backhaul subframe. Relay station 120 may transmit to and/or receive from UE 130 in each access subframe. Relay station 120 may declare the backhaul subframes as MBSFN subframes (as shown in FIG. 11), which may have a periodicity of 10 ms, or as blank subframes.

In the example shown in FIG. 11, subframes 0, 4 and 5 in the downlink and subframe 4, 8 and 9 in the uplink of each radio frame may be access subframes. Subframes 1, 2, 3, 6, 7, 8 and 9 in the downlink and subframes 0, 1, 2, 3, 5, 6 and 7 in the uplink of each radio frame may be backhaul subframes. For the access downlink, relay station 120 may transmit data to UE 130 in subframes 0, 4 and 5 and may receive ACK information (e.g., ACK or NAK) from UE 130 in subframes 4, 8 and 9, respectively. Since asynchronous HARQ is used for the downlink, relay station 120 may send retransmissions in subframes 0, 4 and 5. The access downlink may operate with a 10 ms timeline. For example, relay station 120 may send a transmission in subframe 0 of a given radio frame, receive NAK in subframe 4, and then send a retransmission in subframe 0 of the next radio frame.

For the access uplink, UE 130 may send data to relay station 120 in subframes 4, 8 and 9 and may receive ACK information from relay station 120 in subframes 8, 2 and 3, respectively. Relay station 120 may target the first transmission for legacy UEs and may operate with a 10 ms timeline for new UEs. In one design, if the first transmission is unsuccessful, then UE 130 may be configured to transmit in other subframes. Since synchronous HARQ is used for the uplink, UE 130 may send retransmissions in specific subframes. For example, UE 130 may send a transmission of a packet in subframe 4 of a given radio frame and may receive ACK information in subframe 8. Since subframe 8 is an MBSFN subframe, relay station 120 can send the ACK information on the access downlink in this subframe even though it is reserved for the backhaul downlink. UE 130 may receive NAK in subframe 8 and may retransmit the data in the following subframe 2. However, this uplink subframe may be reserved for the backhaul uplink. In this case, relay station 120 may (i) listen to UE 130 and cancel its uplink transmission or (ii) continue transmission in the backhaul uplink and ignore the UE retransmission until the retransmission coincide with a subframe for the access uplink.

In another design, an "ACK and suspend" procedure may be used. For example, relay station 120 may schedule UE 130 on the uplink with a target termination of one transmission. UE 130 may send a transmission of a packet. If relay station 120 is unable to send ACK information for this transmission (e.g., because relay station 120 may be listening on the backhaul link), then UE 130 may treat this as an implicit ACK and may suspend its transmissions. However, UE 130 does not discard the packet. If relay station 120 decoded the packet in error, then relay station 120 can subsequently schedule a second transmission of the packet in a subframe for which it is able to transmit assignments, and the suspension covered by the implicit ACK may then be revoked. A similar scenario may occur when eNB 110 schedules relay station 120 on the uplink. Relay station 120 may send the packet but may not be able to receive the ACK information from eNB 110 because it may be transmitting to UE 130 on the access link. Relay station 120 may treat it as an implicit ACK but may not discard the packet. If eNB 110 decoded the packet in error, then it can schedule relay station 120 to retransmit the packet on the uplink.

Figure 12:
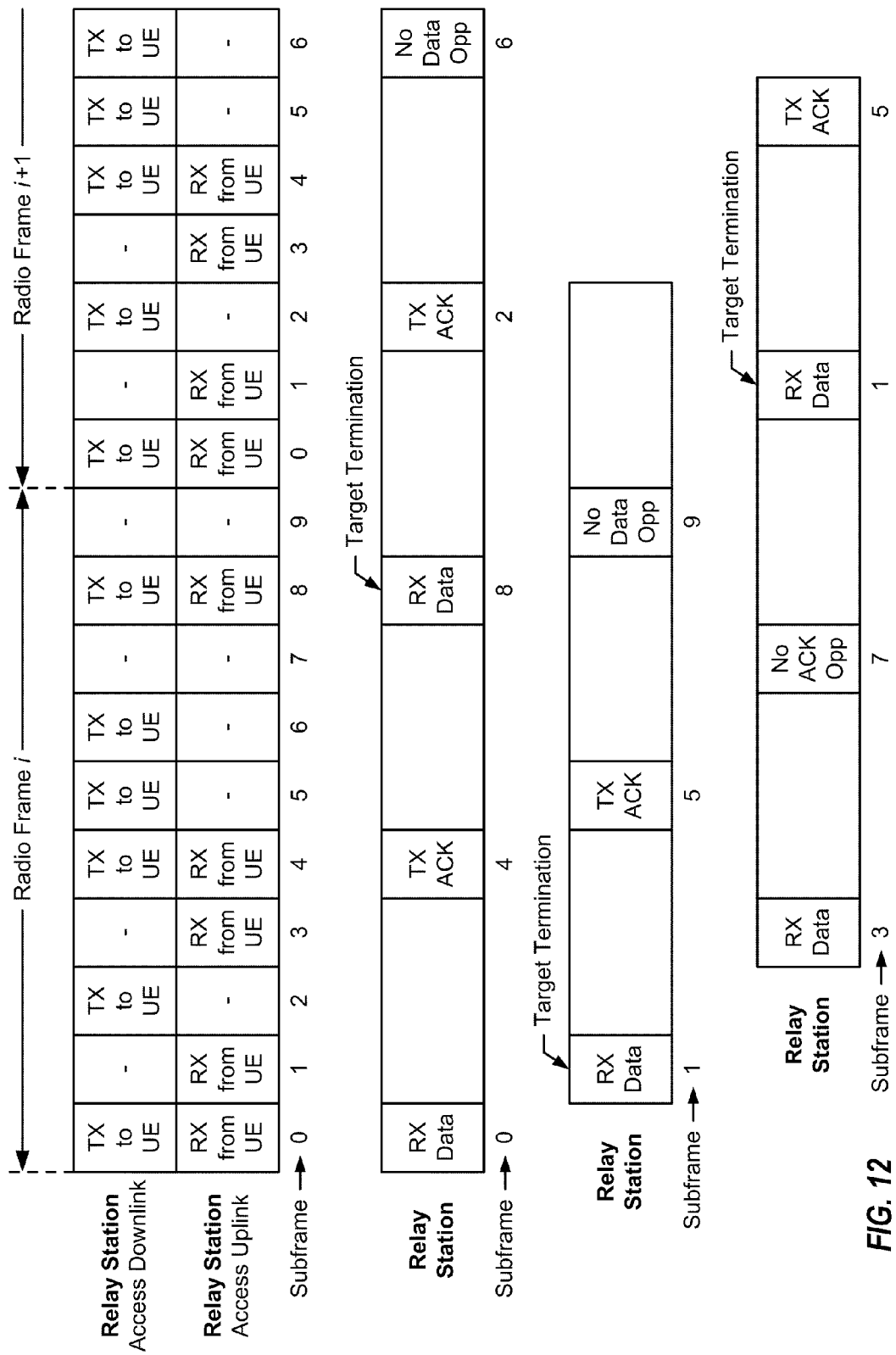
FIG. 12 shows data transmission with synchronous hybrid automatic retransmission (HARQ).

FIG. 12 illustrates selection of a target termination based on transmission opportunities. FIG. 12 shows a different partition between the access link and the backhaul link than the partition shown in FIG. 11. In the example shown in FIG. 12, subframes 0, 2, 4, 5, 6 and 8 in the downlink and subframes 0, 1, 3, 4 and 8 in the uplink are used for the access link while the remaining subframes are used for the backhaul link. Relay station 120 may mark the backhaul subframes as blank subframes and may not transmit any control information or data to its UEs in these subframes. In one design, UE 130 may send a packet with a target termination determined based on ACK transmission opportunities available to relay station 120. An ACK transmission opportunity may correspond to a subframe in which ACK information can be sent (due to synchronous HARQ requirement) and which is available for use. In the example shown in FIG. 12, UE 130 may start transmission of the packet in subframe 0 of radio frame i and may have a data transmission opportunity in subframe 8 but no data transmission opportunity in subframe 6 of the next radio frame i+1. Relay station 120 may have ACK transmission opportunities in subframe 4 of radio frame i as well as subframe 2 of the next radio frame. Relay station 120 may then select a target termination of two transmissions for the packet for UE 130. UE 130 may also start transmission of a packet in subframe 1 of radio frame i and may have a target termination of one transmission due to no data transmission opportunity in subframe 9, as shown in FIG. 12.

Relay station 120 may send ACK information after each transmission of data by UE 130, e.g., as shown by the first two examples in FIG. 12. In another design, relay station 120 may not be able to send ACK information after each transmission of data and may send the ACK information at the next ACK transmission opportunity. For example, UE 130 may send a first transmission of a packet in subframe 3 of radio frame i, receive no ACK information in subframe 7, send a second transmission of the packet in subframe 1 of the next radio frame i+1, and receive ACK information for the packet in subframe 5 of the next radio frame, as shown by the third example in FIG. 12. Relay station 120 may select a target termination of two transmissions for the packet to make efficient use of the uplink resources.

In general, the target termination for a packet may be determined based on the first subframe that cannot be used to send the packet or based on when ACK information can be sent and/or received. In one design, ACK information may be sent after each transmission of the packet. In this design, the target termination may be selected based on the first subframe in which ACK transmission opportunities are not available for the packet. In another design, ACK information may be delayed. In this design, the target termination for the packet may be K transmissions if an ACK transmission opportunity is available for the packet after K transmissions, where K may be any integer value greater than or equal to one. In the exemplary partition shown in FIG. 12, relay station 120 may select (i) a target termination of one transmission for a packet sent starting in subframe 1, 4 or 8 and (ii) a target termination of two transmissions for a packet sent starting in subframe 0 or 3.

In another design, UE 130 may send packets to relay station 120 in a manner to target termination of each packet on the first transmission. In this case, relay station 120 would not need to monitor other subframes for retransmissions. For packets that do not terminate on the first transmission, UE 130 may send retransmissions in accordance with synchronous HARQ. Relay station 120 may receive the retransmissions sent by UE 130 in backhaul subframes instead of listening to eNB 110. Alternatively, relay station 120 may ignore the retransmissions sent by UE 130 in backhaul subframes and may wait for subsequent retransmissions sent in access subframes, which may result in higher latency. In general, relay station 120 may receive retransmissions from UE 130 whenever possible and may ignore retransmissions that cannot be received for whatever reason.

For the example shown in FIG. 12, relay station 120 may communicate with eNB 110 via the backhaul downlink in subframes 1, 3, 7 and 9 and via the backhaul uplink in subframes 2, 5, 6, 7 and 9 in an analogous manner. For the backhaul downlink, eNB 110 may transmit data to relay station 120 in subframes 1 and 3 and may receive ACK information in subframes 5 and 7, respectively. eNB 110 may also send retransmissions in any suitable subframe with asynchronous HARQ. For the backhaul uplink, relay station 120 may send data to eNB 110 in subframes 5, 7 and 9 and may receive ACK information in subframes 9, 1, and 3, respectively. Relay station 120 may send packets to eNB 110 based on the data transmission opportunities available to relay station 120 and the ACK transmission opportunities available to eNB 110. Some subframes may not have ACK transmission opportunities. The techniques described above, such as the ACK and suspend procedure and the termination target selection, may be used for subframes that do not have corresponding ACK transmission opportunities. Alternatively, relay station 120 may send packets to eNB 110 in a manner to target termination of each packet on the first transmission. For packets that do not terminate on the first termination, relay station 120 may send retransmissions in accordance with synchronous HARQ. In one design, relay station 120 may send retransmissions in backhaul subframes and may skip retransmissions in the access subframes. eNB 110 may then receive the retransmissions sent by relay station 120 in the backhaul subframes. In another design, relay station 120 may send retransmissions in both backhaul and access subframes. In this design, relay station 120 may skip listening to UE 130 in the access subframes. In yet another design, relay station 120 may use asynchronous HARQ on the uplink and may send the retransmission on other backhaul subframes that may not be part of the interlace used for the first transmission.

For both the backhaul link and the access link, ACK information may be sent a fixed number of subframes (e.g., four subframes) after the corresponding transmission of data. This may limit the number of subframes that may be used to send data on the backhaul and access links. In one design, eNB 110 may send ACK information in non-fixed subframes (e.g., in the next ACK transmit opportunity) to relay station 120. For example, relay station 120 may send a transmission of data to eNB 110 in subframe 1 and may receive ACK information for this transmission in subframe 6 (instead of subframe 5). Similarly, relay station 120 may send ACK information in non-fixed subframes (e.g., in the next ACK transmit opportunity) to eNB 110. For example, eNB 110 may send a transmission of data to relay station 120 in subframe 1 and may receive ACK information for this transmission in subframe 6 (instead of subframe 5). Thus, the subframes used to send/receive ACK information to/from relay station 120 may be different than the subframes that would be used if a legacy/Release 8 UE had been scheduled instead of relay station 120. For both the backhaul downlink and uplink, relay station 120 (or eNB 110) may send signaling to convey use of a different subframe for sending ACK information. eNB 110 (or relay station 120) may then receive the ACK information in the indicated subframe.

Relay station 120 may elect to receive data and/or ACK information from UE 130 in backhaul subframes and may be unable to send data and/or ACK information to eNB 110 in these subframes. Relay station 120 may indicate this to eNB 110 (e.g., via a control channel) so that eNB 110 can wait for data and/or ACK information from relay station 120. eNB 110 may also infer this through other means. For example, eNB 110 may be aware that relay station 120 may monitor for ACK information from UE 130 in subframe 4 and 9 in response to transmissions of data from relay station 120 to UE 130 in subframes 0 and 5, respectively. Relay station 120 may then send data and/or ACK information in other subframes. If eNB 110 is aware that relay station 120 will not use resources in the backhaul subframes reserved for relay station 120, then eNB 110 may schedule other UEs on these resources in order to more fully utilize the available resources.

In another design, transmissions and retransmissions on the backhaul link and the access link may be sent with 8 ms timelines. One or more interlaces may be used for the access link, and the subframes in the interlace(s) may be access subframes. The remaining interlaces may be used for the backhaul link, and the subframes in these interlaces may be backhaul subframes. Relay station 120 may configure the backhaul subframes as MBSFN subframes or blank subframe in order to be able to listen to eNB 110 efficiently. However, in some subframes of the backhaul interlaces, relay station 120 may be forced to transmit signals. For example, in subframes 0 and 5, relay station 120 may be required to transmit the PSS, SSS, etc. Relay station 120 may send transmissions in these backhaul subframes to UE 130, there by converting these subframes to access subframes.

Only one HARQ process is typically active on a given interlace at any given moment. In one design, multiple HARQ processes may be interleaved on the same interlace to provide more processing time. This interleaving of HARQ processes may be applied to both the access link and the backhaul link. For example, eNB 110 may transmit packet 1 on the first downlink HARQ process to relay station 120 in subframe 6. Relay station 120 may be forced to transmit to its UEs in subframe 0 of the next radio frame and may not be able to send ACK information to eNB 110. In subframe 4 of the next radio frame, eNB 110 may transmit a new packet (packet 2) on a second downlink HARQ process instead of retransmitting packet 1 on the first downlink HARQ process. The interlace may then alternate between the packets for the first and second downlink HARQ processes. This may give relay station 120 more time to send the ACK information to eNB 110. eNB 110 may retransmit a packet only if a NACK is received, thus improving relay operation.

Relay station 120 may schedule uplink data for its UEs in an uplink subframe that carries ACK information corresponding to downlink transmission in subframes that were initially reserved for the backhaul link, even though the uplink subframe is part of an interlace reserved for the backhaul link. In this case, relay station 120 may monitor for transmission in the uplink subframe (as well as an uplink ACK for downlink data). Relay station 120 may send ACK information for a packet only when the position of the ACK coincides with an access downlink subframe when the backhaul subframes are marked as blank subframes. If the backhaul subframes are configured as MBSFN subframes, then relay station 120 may send the ACK information for the uplink transmission.

Relay station 120 may transmit the PSS and SSS in subframes 0 and 5 of each radio frame even for the 8 ms timelines. If a given subframe 0 or 5 lies on a backhaul interlace, then relay station 120 may skip communication with eNB 110 and may transmit to its UEs in the backhaul subframe, thereby converting this subframe into an access subframe. In this case, relay station 120 may not be able to receive from eNB 110 during the subframe. If eNB 110 has ACK information to send to relay station 120 in the subframe, then eNB 110 may delay transmission of the ACK information until the next backhaul subframe. Similarly, if relay station 120 has ACK information to send to eNB 110 in an uplink subframe that is used for the access link, then relay station 120 may delay transmission of the ACK information until the next backhaul subframe. In another design, relay station 120 may skip mandated transmission such as the PSS and SSS in subframes 0 and 5 that are backhaul subframes and may instead communicate with eNB 110.

In one design, an ACK repetition scheme may be used to ensure that UE 130 transmits ACK information in subframes that relay station 120 monitors. UE 130 may have ACK information to send in a backhaul subframe. UE 130 may send the ACK information in this subframe with the possibility that relay station 120 may monitor the access link instead of communicating with eNB 110 on the backhaul link. Alternatively or additionally, UE 130 may send the ACK information in the next access subframe that relay station 120 will monitor. UE 130 may send ACK information for multiple packets in a given subframe, e.g., ACK information to be sent in the current subframe as well as ACK information to be sent in a prior subframe that is repeated in the current subframe.

5. Subframe Offset/Periodic Control Channels

In another aspect, the timing of relay station 120 may be offset by an integer number of subframes from the timing of eNB 110. The subframe offset may allow relay station 120 to transmit the PSS, SSS and PBCH to its UEs and also receive the PSS, SSS and PBCH from eNB 110.

Figure 13:
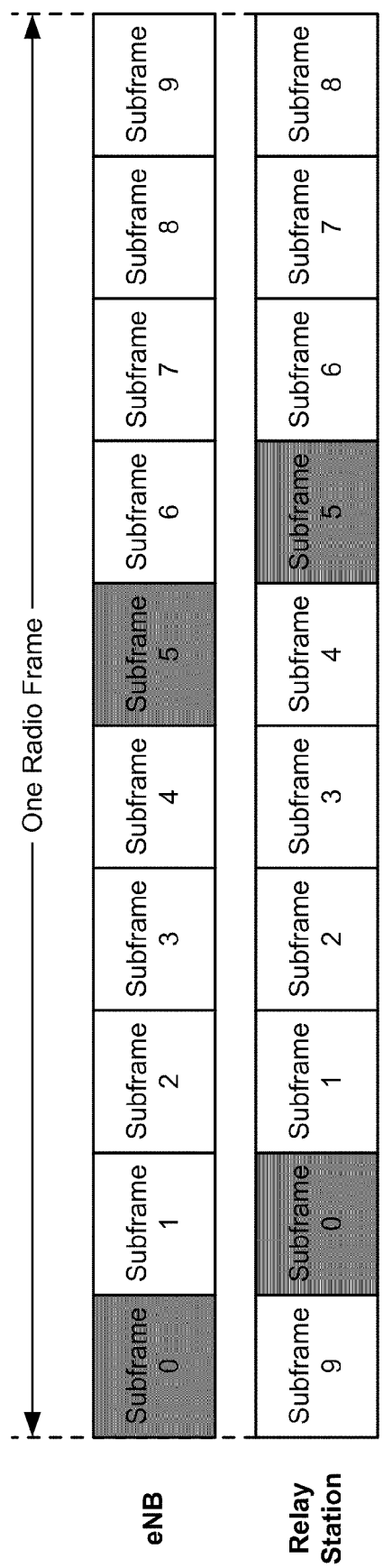
FIG. 13 shows subframe timing offset between a base station and a relay station.

FIG. 13 shows a design of subframe timing offset between eNB 110 and relay station 120. The timing of relay station 120 may be delayed (as shown in FIG. 13) or advanced by an integer number of subframes (e.g., by one subframe) relative to the timing of eNB 110. eNB 110 may transmit the PSS, SSS, and possibly PBCH in its subframes 0 and 5, which may correspond to subframes 9 and 4, respectively, of relay station 120. Relay station 120 can receive the PSS, SSS, and possibly PBCH from eNB 110. Relay station 120 may transmit the PSS, SSS and PBCH in its subframes 0 and 5, which may correspond to subframes 1 and 6, respectively, of eNB 110.

As shown in FIG. 13, a subframe offset between eNB 110 and relay station 120 may result in eNB subframe 0 being equal to relay subframe k, where k≠0. The subframe offset may allow relay station 120 to monitor the PSS, SSS and PBCH from eNB 110. The subframe offset may also allow eNB 110 to schedule system information blocks (SIBs) in a subframe in which relay station 120 will monitors eNB 110. In some situations, a subframe offset may not be sufficient to enable relay station 120 to receive the PSS, SSS, PBCH, and/or SIBs (e.g., for TDD operation where subframe offset may not be possible). In these situations, the PSS, SSS, PBCH, and/or SIBs, may be sent in a separate channel to allow relay station 120 to receive them. Alternately, relay station 120 may periodically tune away (e.g., not transmit data to UE 130) and receive such transmissions from eNB 110.

Relay station 120 may receive periodic control channels from UE 130 and/or may transmit periodic control channels to eNB 110. The periodic control channels may carry channel quality indicator (CQI) information, a sounding reference signal (SRS), etc. LTE currently supports periodicity of 2, 5, 10, 20 and 40 ms for the periodic control channels.

On the access link, relay station 120 may monitor subframes with a periodicity of 8 ms. The periodic control channels may be sent with a periodicity of 2 ms in order to ensure that relay station 120 can receive these control channels every 8 ms. Alternately, UE 130 may send the periodic control channels with a periodicity of 5, ms or some other duration. Relay station 120 may either monitor the periodic control channels from UE 130 or wait until the periodic control channels coincide with an access subframe.

In another design, a periodicity of 8 ms, or some other integer multiple of the periodicity of data sent with HARQ, may be supported for the periodic control channels. This may allow relay station 120 to receive each transmission of the periodic control channels sent by UE 130, which may avoid wasted UE transmissions. This may also allow eNB 110 to receive each transmission of the periodic control channels sent by relay station 120.

6. Asymmetric Backhaul/Access Partition

In another aspect, asymmetric downlink/uplink partitioning of the backhaul link and the access link may be employed to enable efficient use of resources. The partitioning may be based on a pattern that may repeat every S subframes, where S may be equal to 8, 10, etc. For the downlink, the S subframes may be partitioned such that $U_{DL}$ subframes are used for the backhaul downlink and $V_{DL}$ subframes are used for the access downlink, where $S=U_{DL}+V_{DL}$. For the uplink, the S subframes may be partitioned such that $U_{UL}$ subframes are used for the backhaul uplink and $V_{UL}$ subframes are used for the access uplink, where $S=U_{UL}+V_{UL}$. For asymmetric downlink/uplink partition, $U_{DL} \neq U_{UL}$ and $V_{DL} \neq V_{UL}$.

Figure 14:
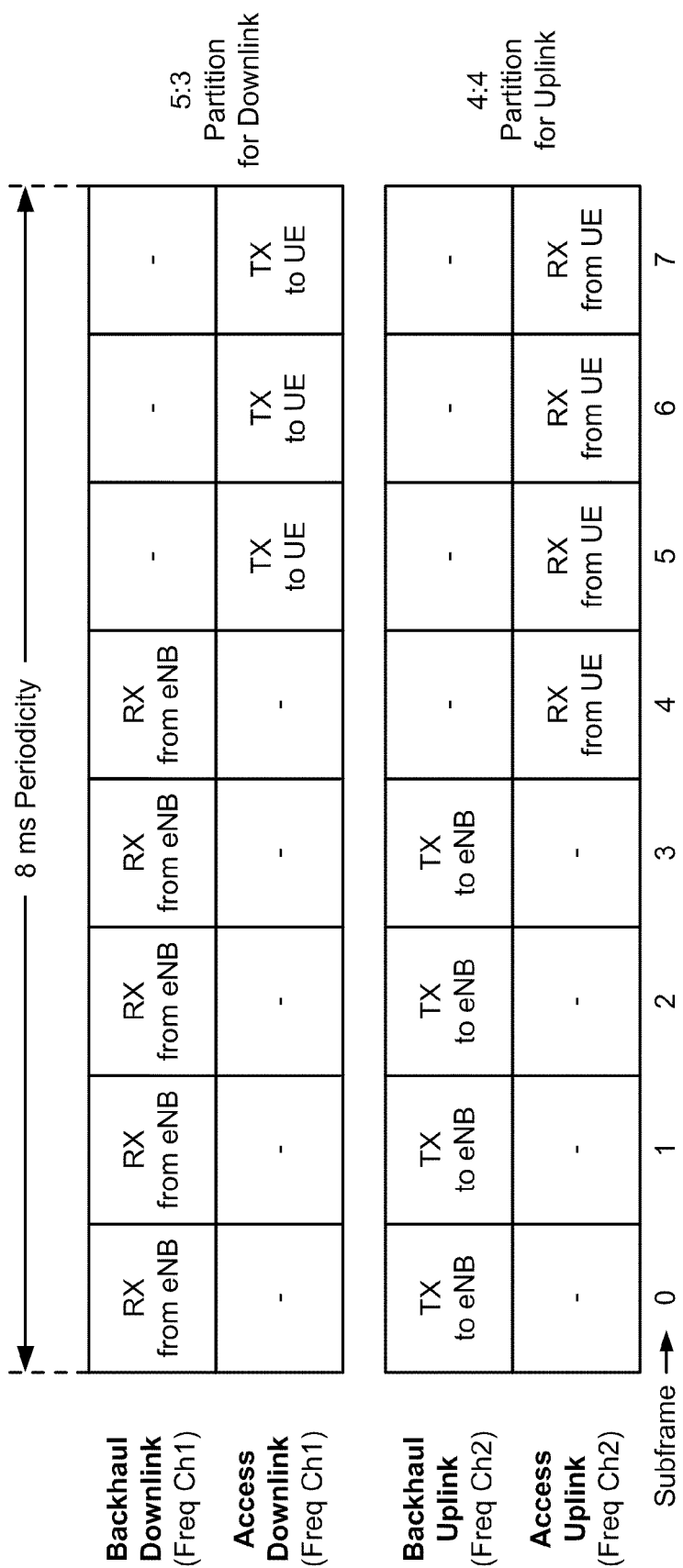
FIG. 14 shows an exemplary asymmetric downlink/uplink partitioning.

FIG. 14 shows an example of asymmetric downlink/uplink partition. In this example, S is equal to 8, a 5:3 backhaul/access partition is used for the downlink, and a 4:4 backhaul/access partition is used for the uplink. For simplicity, FIG. 14 shows relay station 120 (i) receiving from eNB 110 on the backhaul downlink in subframes 0 to 4 and (ii) transmitting to UE 130 on the access downlink in subframes 5 to 7 for the 5:3 backhaul/access downlink partition. FIG. 14 also shows relay station 120 (i) transmitting to eNB 110 on the backhaul uplink in subframes 0 to 3 and (ii) receiving from UE 130 on the access uplink in subframes 5 to 7 for the 4:4 backhaul/access uplink partition. As shown in FIG. 14, relay station 120 may transmit and receive on different frequency channels in each subframe except for subframe 4, and may receive on two frequency channels in subframe 4. Relay station 120 may thus conform to a requirement of not transmitting and receiving on the same frequency channel at the same time. In general, the subframes used for the backhaul and access downlinks may be distributed across the 8 subframes, and the subframes used for the backhaul and access uplinks may also be distributed across the 8 subframes, subject to the transmit/receive requirement described above.

The backhaul/access partitions for the downlink and uplink may be determined in various manners. In one design, the backhaul/access partition for each link may be determined based on channel conditions. For example, more subframes may be used for the link with worse channel conditions in order to satisfy data requirements for that link. Alternatively, more subframes may be used for the link with better channel conditions in order to improve throughput. In another design, the backhaul/access partition for each link may be dependent on data requirements for that link, which may in turn be dependent on the number of UEs being served and the data requirements of each UE. For example, eNB 110 may serve many UEs whereas relay station 120 may serve one or few UEs. In this case, more subframes may be used for the backhaul downlink and uplink, and fewer subframes may be used for the access downlink and uplink. In general, any backhaul/access partition may be supported for the downlink and uplink. Furthermore, MBSFN subframes may be used to support any backhaul/access partition for each link. MBSFN subframes may reduce the amount of transmissions by relay station 120 and may make it more efficient to listen to eNB 110 in the backhaul downlink subframes. MBSFN subframes that are reserved for the backhaul link may also support transmission of control information to relay UEs. Hence, for the access link, the impact on scheduling uplink transmissions and sending ACK information for uplink transmissions may be small. MBSFN subframes may allow efficient operation of relay station 120 even with asymmetric partitioning of uplink and downlink subframes.

In one design that is shown in FIG. 14, asymmetric backhaul/access partition may be achieved by allocating different numbers of interlaces for different links. In another design, asymmetric backhaul/access partition may be achieved by subsampling of interlaces. For example, even numbered subframes in a given interlace may be used for the backhaul link, and odd numbered subframes in the interlace may be used for the access link. Relay station 120 may know that only alternate subframes in the interlace are available for the access link and may be able to receive transmissions from UE 130 in these alternate subframes. Relay station 120 may select the modulation and coding scheme for UE 130 accordingly. For example, relay station 120 may target termination after the first transmission from UE 130.

Due to the asymmetric partitioning, to schedule UE 130 on the access link and/or to send ACK information corresponding to an uplink transmission, relay station 120 may transmit control information in subframes reserved for the backhaul link. If relay station 120 uses MBSFN subframes for the backhaul link, then relay station 120 may be able to send ACK information for data transmission received from UE 130 and other control information such as uplink grant in any subframe. In this case, relay station 120 may transmit control information and reference signal in the first one or two OFDM symbols of a backhaul downlink subframe marked as an MBSFN subframe by relay station 120 and may use the remaining symbol periods in the subframe to listen to eNB 110. New control channels for uplink and/or downlink may also be used to send ACK information, grants, and/or other information to/from UEs capable of receiving/transmitting these control channels.

In the backhaul link, for uplink and/or downlink, new control channels may be used to send ACK information, grants, etc. The new control channels may be sent in a designated subframe (e.g., ACK information may be sent in subframe t+4 for data transmission sent in subframe t) or in a different subframe. For the 5:3 backhaul/access downlink partition shown in FIG. 14, the ACK information for the extra backhaul downlink subframe 4 may be sent in one of the four backhaul uplink subframes.

7. TDD Relay

LTE supports a number of downlink-uplink configurations for TDD. Table 1 lists the downlink-uplink configurations supported by LTE Release 8 and provides the allocation of subframes for each configuration. In Table 1, "D" denotes a downlink subframe, "U" denotes an uplink subframe, and "S" denotes a special subframe comprising the DwPTS, GP and UpPTS fields shown in FIG. 3.

TABLE 1

Downlink-Uplink Configurations for TDD

| Downlink-Uplink Configuration | Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A particular downlink-uplink configuration may be selected for use. The available downlink and uplink subframes in the selected downlink-uplink configuration may be allocated to the backhaul link and the access link, which may be time division multiplexed. In one design, blank subframes may be declared for the backhaul subframes so that UEs served by relay station 120 can be inactive in these subframes. In another design, MBSFN subframes may be used for the backhaul subframes.

Relay station 120 may transmit the PSS, SSS, and possibly PBCH in subframes 0, 1, 5 and 6. Relay station 120 may avoid transmitting on the access downlink during the backhaul uplink subframes in order to avoid causing high interference to eNB 110. Relay station 120 may transmit on the access downlink in the backhaul uplink subframes if it will not cause high interference to eNB 110, e.g., if the downlink antenna beam pattern for relay station 120 can provide sufficient RF isolation to avoid jamming eNB 110. Relay station 120 may also schedule uplink transmissions for its UEs only in subframes that are used by eNB 110 for uplink so that its UEs can avoid causing interference to UEs transmitting to eNB 110.

Table 2 shows some backhaul-access configurations that satisfy the constraints described above and may be selected for use. In Table 2, backhaul-access configuration X or XY is based on downlink-uplink configuration X. Y denotes one of multiple alternatives (if available) for configuration X. For each backhaul-access configuration in Table 2, subframes allocated for the backhaul link are shown with shading, and subframes allocated for the access link are shown without shading.

TABLE 2

Backhaul-Access Configurations for TDD

| Backhaul-Access Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 1A | D | S | U | U | D | D | S | U | U | D |
| 1B | D | S | U | U | D | D | S | U | U | D |
| 1C | D | S | U | U | D | D | S | U | U | D |
| 2A | D | S | U | U | D | D | S | U | D | D |
| 2B | D | S | U | D | D | D | S | U | U | D |

TABLE 2-continued

Backhaul-Access Configurations for TDD

| Backhaul-Access Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 3 | D | S | ▒ | U | U | D | D | ▒ | D | ▒ |
| 4 | D | S | ▒ | U | D | D | ▒ | ▒ | D | ▒ |

Table 3 lists the number of subframes for each link for each backhaul-access configuration in Table 2.

TABLE 3

Number of Subframes for Each Link for TDD

| Backhaul-Access Configuration | Backhaul Link | | Access Link | |
|---|---|---|---|---|
| | Downlink | Uplink | Downlink | Uplink |
| 1A | 2 | 2 | 4 | 2 |
| 1B | 1 | 1 | 5 | 3 |
| 1C | 1 | 1 | 5 | 3 |
| 2A | 2 | 1 | 6 | 1 |
| 2B | 2 | 1 | 6 | 1 |
| 3 | 2 | 1 | 5 | 2 |
| 4 | 3 | 1 | 5 | 1 |

FIG. 15 shows a design of a process 1500 for broadcasting subframe type information in a wireless communication system. A bitmap covering a plurality of radio frames (e.g., four radio frames) may be generated, with each radio frame comprising a plurality of subframes (block 1512). The bitmap may identify subframes of at least two types in the plurality of radio frames. The bitmap may be transmitted to UEs (block 1514). In one design, the subframes of at least two types may comprise (i) MBSFN subframes with limited control information and/or limited reference signal and (ii) regular subframes with control information, reference signal, and data. In another design, the subframes of at least two types may comprise (i) blank subframes with no transmission and (ii) regular subframes. In one design, the bitmap may be generated by a relay station and transmitted to the UEs. In another design, the bitmap may be generated by a base station and transmitted to the UEs.

FIG. 16 shows a design of an apparatus 1600 for broadcasting subframe type information in a wireless communication system. Apparatus 1600 includes a module 1612 to generate a bitmap covering a plurality of radio frames, each radio frame comprising a plurality of subframes, with the bitmap identifying subframes of at least two types in the plurality of radio frames, and a module 1612 to transmit the bitmap to UEs.

FIG. 17 shows a design of a process 1700 for performing channel estimation or measurement in a wireless communication system. Process 1700 may be performed by a station, which may be a relay station, a UE, or some other entity. The station may receive a bitmap identifying subframes of a first type (e.g., regular subframes) and subframes of a second type (e.g., MBSFN subframes or blank subframes) different from the first type (block 1712). The subframes of the first type and the subframes of the second type may be designated by a base station or some other designated entity. The station may receive the subframes of the first type TDMed with the subframes of the second type (block 1714). The station may perform channel estimation or measurement for the subframes of the first type (block 1716). The subframes of the first type may include a reference signal, and the station may perform channel estimation or measurement based on the reference signal. The station may skip channel estimation and measurement for the subframes of the second type (block 1718).

FIG. 18 shows a design of an apparatus 1800 for performing channel estimation or measurement in a wireless communication system. Apparatus 1800 includes a module 1812 to receive a bitmap identifying subframes of a first type and subframes of a second type different from the first type, a module 1814 to receive the subframes of the first type TDMed with the subframes of the second type, a module 1816 to perform channel estimation or measurement for the subframes of the first type, and a module 1818 to skip channel estimation and measurement for the subframes of the second type.

Figure 19:
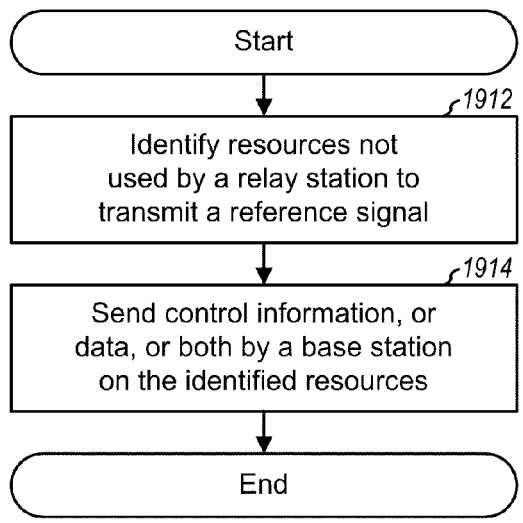
FIGS. 19 and 20 show a process and an apparatus, respectively, for avoiding interference to reference signal.

FIG. 19 shows a design of a process 1900 for avoiding interference to reference signal in a wireless communication system. Process 1900 may be performed by a base station or some other entity. The base station may identify resources not used by a relay station to transmit a reference signal (block 1912). In one design, the identified resources may comprise at least one OFDM symbol in a data portion of an MBSFN subframe. In another design, the identified resources may comprise at least one resource block in a data portion of an MBSFN subframe. The base station may send control information and/or data on the identified resources (block 1914). This may avoid causing interference to the reference signal from the relay station.

Figure 20:
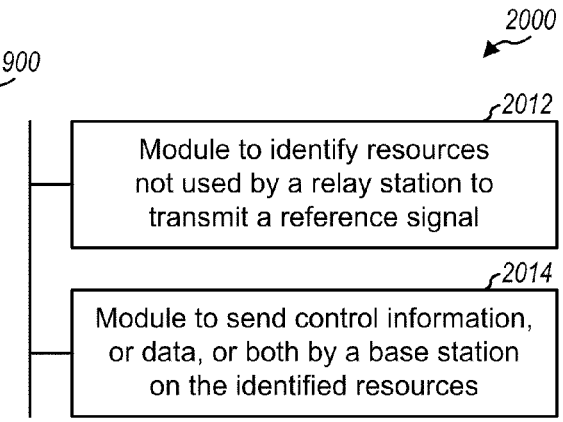

FIG. 20 shows a design of an apparatus 2000 for avoiding interference to reference signal in a wireless communication system. Apparatus 2000 includes a module 2012 to identify resources not used by a relay station to transmit a reference signal, and a module 2014 to send control information, or data, or both by a base station on the identified resources.

Figure 21:
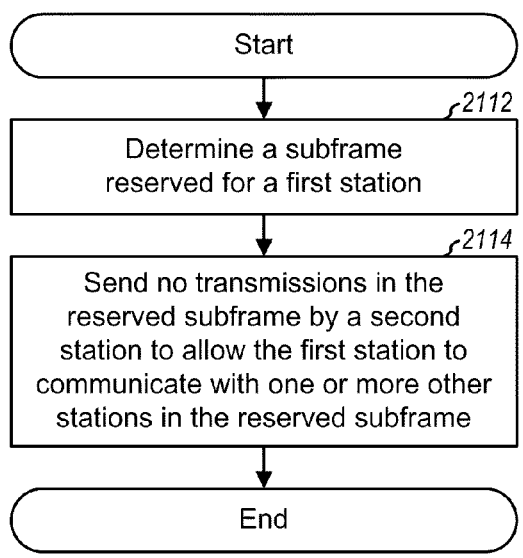
FIGS. 21 and 22 show a process and an apparatus, respectively, for facilitating communication in a wireless communication system

FIG. 21 shows a design of a process 2100 for facilitating communication for a first station by a second station in a wireless communication system. The second station may determine a subframe reserved for the first station (block 2112). The second station may send no transmissions in the reserved subframe to allow the first station to communicate with one or more other stations in the reserved subframe (block 2114). In one design, the first station may be a relay station, the second station may be a base station, and the one or more other stations may be one or more UEs. In another design, the first station may be a base station, the second station may be a relay station, and the one or more other stations may be one or more UEs.

Figure 22:
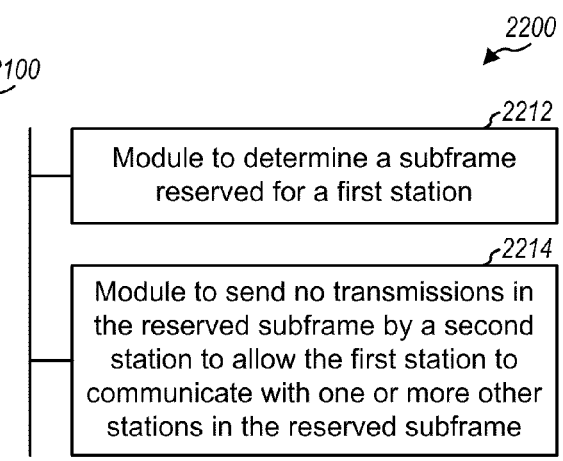

FIG. 22 shows a design of an apparatus 2200 for facilitating communication for a first station by a second station in a wireless communication system. Apparatus 2200 includes a module 2212 to determine a subframe reserved for a first station, and a module 2214 to send no transmissions in the reserved subframe by a second station to allow the first station to communicate with one or more other stations in the reserved subframe.

The modules in FIGS. 16, 18, 20 and 22 may comprise processors, electronics devices, hardware devices, electronics components, logical circuits, memories, software codes, firmware codes, etc., or any combination thereof.

FIG. 23 shows a block diagram of a design of base station/eNB 110, relay station 120, and UE 130. Base station 110 may send transmissions to one or more UEs on the downlink and may also receive transmissions from one or more UEs on the uplink. For simplicity, processing for transmissions sent to and received from only UE 130 is described below.

At base station 110, a transmit (TX) data processor 2310 may receive packets of data to send to UE 130 and other UEs and may process (e.g., encode and modulate) each packet in accordance with a selected MCS to obtain data symbols. For HARQ, processor 2310 may generate multiple transmissions of each packet and may provide one transmission at a time. Processor 2310 may also process control information to obtain control symbols, generate reference symbols for reference signal, and multiplex the data symbols, the control symbols, and the reference symbols. Processor 2310 may further process the multiplexed symbols (e.g., for OFDM, etc.) to generate output samples. A transmitter (TMTR) 2312 may condition (e.g., convert to analog, amplify, filter, and upconvert) the output samples to generate a downlink signal, which may be transmitted to relay station 120 and UEs.

At relay station 120, the downlink signal from base station 110 may be received and provided to a receiver (RCVR) 2336. Receiver 2336 may condition (e.g., filter, amplify, downconvert, and digitize) the received signal and provide input samples. A receive (RX) data processor 2338 may process the input samples (e.g., for OFDM, etc.) to obtain received symbols. Processor 2338 may further process (e.g., demodulate and decode) the received symbols to recover control information and data sent to UE 130. A TX data processor 2330 may process (e.g., encode and modulate) the recovered data and control information from processor 2338 in the same manner as base station 110 to obtain data symbols and control symbols. Processor 2330 may also generate reference symbols, multiplex the data and control symbols with the reference symbols, and process the multiplexed symbol to obtain output samples. A transmitter 2332 may condition the output samples and generate a downlink relay signal, which may be transmitted to UE 130.

At UE 130, the downlink signal from base station 110 and the downlink relay signal from relay station 120 may be received and conditioned by a receiver 2352, and processed by an RX data processor 2354 to recover the control information and data sent to UE 130. A controller/processor 2360 may generate ACK information for correctly decoded packets. Data and control information (e.g., ACK information) to be sent on the uplink may be processed by a TX data processor 2356 and conditioned by a transmitter 2358 to generate an uplink signal, which may be transmitted to relay station 120.

At relay station 120, the uplink signal from UE 130 may be received and conditioned by receiver 2336, and processed by RX data processor 2338 to recover the data and control information sent by UE 130. The recovered data and control information may be processed by TX data processor 2330 and conditioned by transmitter 2332 to generate an uplink relay signal, which may be transmitted to base station 110. At base station 110, the uplink relay signal from relay station 120 may be received and conditioned by a receiver 2316, and processed by an RX data processor 2318 to recover the data and control information sent by UE 130 via relay station 120. A controller/processor 2320 may control transmission of data based on the control information from UE 130.

Controllers/processors 2320, 2340 and 2360 may direct operation at base station 110, relay station 120, and UE 130, respectively. Controller/processor 2320 may perform or direct process 1500 in FIG. 15, process 1900 in FIG. 19, process 2100 in FIG. 21, and/or other processes for the techniques described herein. Controller/processor 2340 may perform or direct process 1500, 1700, or 2100 and/or other processes for the techniques described herein. Controller/processor 2360 may perform or direct process 1700 or 2100 and/or other processes for the techniques described herein. Memories 2322, 2342 and 2362 may store data and program codes for base station 110, relay 120, and UE 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   generating a bitmap covering a plurality of radio frames, each radio frame comprising a plurality of subframes, wherein at least one bit in the bitmap identifies a specific type of at least two subframe types for one of the plurality of subframes, and wherein at least one bit in the bitmap indicates to receiving user equipments (UEs) whether to perform a channel characteristic inquiry using the respective subframe based on the subframe type identified by the respective bit; and
   transmitting the bitmap to the UEs, wherein the bitmap includes at least one bit for indicating said type of at least one of said subframes of at least two types, and wherein the subframes of at least two types comprise multicast/broadcast single frequency network (MBSFN)/blank subframes and regular subframes;
   wherein the channel characteristic inquiry includes a channel estimation based on a reference signal that is performed only for the regular subframes and is skipped for the MBSFN/blank subframes.

2. The method of claim 1, wherein the bitmap covers four radio frames.

3. The method of claim 1, wherein the bitmap is generated by a relay station and transmitted to the UEs.

4. The method of claim 1, wherein the bitmap is generated by a base station and transmitted to the UEs.

5. The method of claim 1, wherein the bitmap identifies different subframe types for at least two of the plurality of subframes in one of the plurality of radio frames.

6. The method of claim 1, wherein the channel characteristic inquiry includes a frequency measurement.

7. The method of claim 1, wherein the channel characteristic inquiry includes an interference estimation.

8. An apparatus for wireless communication, comprising:
   means for generating a bitmap covering a plurality of radio frames, each radio frame comprising a plurality of subframes, wherein at least one bit in the bitmap identifies a specific type of at least two subframe types for one of the plurality of subframes, and wherein at least one bit in the bitmap indicates to receiving user equipments (UEs) whether to perform a channel characteristic inquiry using the respective subframe based on the subframe type identified by the respective bit; and
   means for transmitting the bitmap to the UEs, wherein the bitmap includes at least one bit for indicating said type of at least one of said subframes of at least two types, and wherein the subframes of at least two types comprise multicast/broadcast single frequency network (MBSFN)/blank subframes and regular subframes;
   wherein the channel characteristic inquiry includes a channel estimation based on a reference signal that is performed only for the regular subframes and is skipped for the MBSFN/blank subframes.

9. The apparatus of claim 8, wherein the bitmap covers four radio frames.

10. The apparatus of claim 8, wherein the bitmap identifies different subframe types for at least two of the plurality of subframes in one of the plurality of radio frames.

11. The apparatus of claim 8, wherein the channel characteristic inquiry includes a frequency measurement.

12. The apparatus of claim 8, wherein the channel characteristic inquiry includes an interference estimation.

13. An apparatus for wireless communication, comprising:
    at least one processor, and a memory coupled to the at least one processor comprising instructions which, when executed by the at least one processor, cause the apparatus to:
    generate a bitmap covering a plurality of radio frames, each radio frame comprising a plurality of subframes, wherein at least one bit in the bitmap identifies a specific type of at least two subframe types for one of the plurality of subframes, and wherein at least one bit in the bitmap indicates to receiving user equipments (UEs) whether to perform a channel characteristic inquiry using the respective subframe based on the subframe type identified by the respective bit; and
    send the bitmap to the UEs, wherein the bitmap includes at least one bit for indicating said type of at least one of said subframes of at least two types, and wherein the subframes of at least two types comprise multicast/broadcast single frequency network (MBSFN)/blank subframes and regular subframes;
    wherein the channel characteristic inquiry includes a channel estimation based on a reference signal that is performed only for the regular subframes and is skipped for the MBSFN/blank subframes.

14. The apparatus of claim 13, wherein the bitmap covers four radio frames.

15. The apparatus of claim 13, wherein the bitmap identifies different subframe types for at least two of the plurality of subframes in one of the plurality of radio frames.

16. The apparatus of claim 13, wherein the channel characteristic inquiry includes a frequency measurement.

17. The apparatus of claim 13, wherein the channel characteristic inquiries include an interference estimation.

18. A computer program product, comprising:
a non-transitory computer-readable medium comprising:
- code for causing at least one computer to generate a bitmap covering a plurality of radio frames, each radio frame comprising a plurality of subframes, wherein at least one bit in the bitmap identifies a specific type of at least two subframe types for one of the plurality of subframes, and wherein at least one bit in the bitmap indicates to receiving user equipments (UEs) whether to perform a channel characteristic inquiry using the respective subframe based on the subframe type identified by the respective bit; and
- code for causing the at least one computer to send the bitmap to the UEs, wherein the bitmap includes at least one bit for indicating said one of at least one of said subframes of at least two types, and wherein the subframes of at least two types comprise multicast/broadcast single frequency network (MBSFN)/blank subframes and regular subframes;
- wherein the channel characteristic inquiry includes a channel estimation based on a reference signal that is performed only for the regular subframes and is skipped for the MBSFN/blank subframes.

19. The computer program product of claim 18, wherein the bitmap identifies different subframe types for at least two of the plurality of subframes in one of the plurality of radio frames.

20. The apparatus of claim 18, wherein the channel characteristic inquiry includes a frequency measurement.

21. The apparatus of claim 18, wherein the channel characteristic inquiry includes an interference estimation.

\* \* \* \* \*